(12) United States Patent
Yu et al.

(10) Patent No.: US 11,237,017 B2
(45) Date of Patent: Feb. 1, 2022

(54) STRIDE LENGTH CALIBRATION METHOD AND SYSTEM, AND RELATED DEVICE

(71) Applicant: Huawei Technologies Co., Ltd., Shenzhen (CN)

(72) Inventors: Shangchun Yu, Xi'an (CN); Huaiyong Wang, Xi'an (CN); Xiaojie Shao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 16/345,598

(22) PCT Filed: Oct. 26, 2016

(86) PCT No.: PCT/CN2016/103393
§ 371 (c)(1),
(2) Date: Apr. 26, 2019

(87) PCT Pub. No.: WO2018/076205
PCT Pub. Date: May 3, 2018

(65) Prior Publication Data
US 2019/0271564 A1 Sep. 5, 2019

(51) Int. Cl.
*G01C 22/00* (2006.01)
*G01C 25/00* (2006.01)
*G06F 16/23* (2019.01)

(52) U.S. Cl.
CPC .............. *G01C 25/00* (2013.01); *G01C 22/00* (2013.01); *G01C 22/006* (2013.01); *G06F 16/2379* (2019.01)

(58) Field of Classification Search
CPC ...... G01C 25/00; G01C 22/00; G01C 22/006; G06F 16/2379
See application file for complete search history.

(56) References Cited

U.S. PATENT DOCUMENTS 6,813,582 B2   11/2004   Levi et al.
7,057,551 B1    6/2006   Vogt
(Continued)

FOREIGN PATENT DOCUMENTS

CN   101881625 A   11/2010
CN   102853844 A    1/2013
(Continued)

OTHER PUBLICATIONS

Machine Translation and Abstract of Chinese Publication No. CN101881625, Nov. 10, 2010, 18 pages.
(Continued)

*Primary Examiner* — Mohamed Charioui
*Assistant Examiner* — Christine Y Liao
(74) *Attorney, Agent, or Firm* — Conley Rose, P.C.

(57) ABSTRACT

A stride length calibration method includes detecting, by a first device, that a user is walking or running, and collecting a quantity of movement steps of the user. The method further includes determining whether a stride length of the user in a preset database needs to be calibrated. The method further includes requesting to obtain, from a second device, an actual movement distance of the user when calibration is needed. The stride length of the user in the preset database is provided to the first device to calculate a movement distance of the user. The method further includes calculating, by the first device, an actual stride length of the user based on the actual movement distance of the user and the quantity of movement steps of the user. The method further includes updating the stride length of the user in the preset database by using the actual stride length obtained through calculation.

20 Claims, 11 Drawing Sheets

(56) References Cited

U.S. PATENT DOCUMENTS

| | | | |
|---|---|---|---|
| 2012/0330608 A1 | 12/2012 | Wang | |
| 2013/0080255 A1* | 3/2013 | Li | G01C 22/006 705/14.58 |
| 2014/0129177 A1 | 5/2014 | Gyorfi et al. | |
| 2014/0172361 A1 | 6/2014 | Chiang et al. | |
| 2014/0309964 A1* | 10/2014 | Li | G01C 21/16 702/160 |
| 2015/0285659 A1 | 10/2015 | Curtis et al. | |
| 2018/0180442 A1 | 6/2018 | Uchida | |

FOREIGN PATENT DOCUMENTS

| | | |
|---|---|---|
| CN | 103884337 A | 6/2014 |
| CN | 104937376 A | 9/2015 |
| CN | 105403228 A | 3/2016 |
| EP | 2947588 A1 | 11/2015 |
| WO | 2015146046 A1 | 10/2015 |

OTHER PUBLICATIONS

Machine Translation and Abstract of Chinese Publication No. CN105403228, Mar. 16, 2016, 27 pages.

Foreign Communication From a Counterpart Application, PCT Application No. PCT/CN2016/103393, English Translation of International Search Report dated Jun. 28, 2017, 2 pages.

Foreign Communication From a Counterpart Application, PCT Application No. PCT/CN2016/103393, English Translation of Written Opinion dated Jun. 28, 2017, 5 pages.

Foreign Communication From a Counterpart Application, European Application No. 16919864.5, Extended European Search Report dated Oct. 11, 2019, 10 pages.

\* cited by examiner

STRIDE LENGTH CALIBRATION METHOD AND SYSTEM, AND RELATED DEVICE

CROSS-REFERENCE TO RELATED APPLICATIONS

This application is a national stage application of Int'l Patent App. No. PCT/CN2016/103393, filed on Oct. 26, 2016, which is incorporated by reference.

TECHNICAL FIELD

The present invention relates to the field of mobile terminal technologies, and in particular, to a stride length calibration method and system, and a related device.

BACKGROUND

In recent years, consumer electronic products, such as mobile devices (Mobile Devices, including a smartphone, a tablet computer, and the like), are equipped with various types of motion sensors such as an accelerometer, a gyroscope, and a magnetometer, to determine whether a user is in a movement status of walking or running, and can collect a movement index of the user such as a quantity of movement steps, a movement posture, and calorie consumption, so as to provide a better application function and experience for the user.

Currently, the mobile device that is equipped with the motion sensor may be also equipped with a distance monitoring element (for example, a GPS module), or may be not equipped with a distance monitoring element. A mobile device that is equipped with a distance monitoring element, for example, a smartphone, may accurately measure an actual movement distance of a user by using a Global Navigation Satellite System (Global Navigation Satellite System, such as GPS or BeiDou). A mobile device that is not equipped with a distance monitoring element, for example, a wearable device, cannot directly measure an actual movement distance of a user, and mainly obtains the movement distance of the user in the following two manners.

Manner 1: A stride length of the user is estimated based on body feature information that is entered by the user in advance, for example, a height, a weight, and an age, and a movement distance of the user is calculated by using the estimated stride length and a quantity of movement steps collected by the motion sensor. A calculation result obtained in this manner is not reliable, and a relatively large error usually exists between the movement distance obtained through calculation and an actual movement distance of the user.

Manner 2: A communication connection (for example, a Bluetooth connection) to another device that is equipped with a distance monitoring element (for example, a GPS module) is established to obtain an actual movement distance of the user that is measured by the peer device. For example, a wearable device that is not equipped with a GPS module establishes a Bluetooth connection to a smartphone that is equipped with a GPS module, and the wearable device obtains, by using the Bluetooth connection, an actual movement distance of the user that is measured by the smartphone. In this manner, a communication connection needs to be always maintained between the wearable device and the smartphone, and the GPS module of the smartphone needs to be always in an operating state.

For the mobile device that is not equipped with the distance monitoring element, a technical means for obtaining a movement distance of the user that is provided in the prior art is not ideal. It is not convenient for the user to collect statistics about the movement distance by using such a mobile device.

SUMMARY

Embodiments of the present invention provide a stride length calibration method and system, and a related device, so as to perform stride length estimation and calibration on a device that is not equipped with a distance monitoring element, thereby improving accuracy of calculating a movement distance of a user by the device. In addition, after calibration is complete, the device can independently and accurately calculate the movement distance of the user.

According to a first aspect, a stride length calibration method is provided and is applied to a first device side. The method includes: detecting, by a first device, that a user is walking or running, and collecting a quantity of movement steps of the user; and determining whether a stride length of the user in a preset database needs to be calibrated, and if calibration is needed, requesting to obtain, from a second device, an actual movement distance of the user; then, calculating, by the first device, an actual stride length of the user based on the actual movement distance of the user and the quantity of movement steps of the user; and finally, updating, by the first device, the stride length of the user in the preset database by using the actual stride length obtained through calculation.

According to a second aspect, a stride length calibration method is provided and is applied to a second device side. The method includes: receiving, by a second device, a request sent by a first device, responding to the request, collecting an actual movement distance of the user, and sending the actual movement distance of the user to the first device.

Herein, the request is sent by the first device after detecting that the user is walking or running, and determining that a stride length of the user in the preset database needs to be calibrated.

In this embodiment of the present invention, the stride length of the user in the preset database is provided to the first device to calculate the movement distance of the user.

The stride length calibration methods described in the first aspect and the second aspect may be implemented to perform stride length calibration on a stride length in a preset database by using an actual movement distance collected by the second device and an actual quantity of movement steps collected by the first device on the first device side that is not equipped with a distance monitoring element, thereby improving accuracy of calculating the movement distance of the user by the first device. In addition, after calibration is complete, the first device can independently and accurately calculate the movement distance of the user.

With reference to the first aspect or the second aspect, the preset database may further include a movement status parameter of the user, where the movement status parameter of the user is corresponding to the stride length of the user. The movement status parameter of the user includes at least one of the following: a movement stride frequency, a movement type, or a movement environment in which the user is located. In some embodiments, the preset database may further include body feature information of the user, where the body feature information of the user is corresponding to the stride length of the user.

Specifically, when the user is walking or running, the first device may further collect the movement status parameter of the user, and obtain, through calculation based on an actual movement distance and a quantity of movement steps of the user in a movement status represented by a same movement status parameter, an actual stride length of the user in the movement status represented by the same movement status parameter. Then, the first device may update, by using the actual stride length obtained through calculation, a stride length that is in the preset database and that is of the user in the movement status represented by the same movement status parameter.

In some embodiments, the preset database may further include a latest calibration time corresponding to the stride length of the user. During specific implementation, the first device may determine whether a difference between the latest calibration time and a current time is greater than a preset time threshold; and if the difference is greater than the preset time threshold, it is determined that the stride length of the user in the preset database needs to be calibrated; or if the difference is not greater than the preset time threshold, it is determined that the stride length of the user in the preset database does not need to be calibrated.

In some embodiments, after the first device requests to obtain, from the second device, the actual movement distance of the user, the first device may further filter out invalid data from data that represents the actual movement distance.

According to a third aspect, a stride length calibration method is provided and is applied to a second device side. The method includes: detecting, by a second device by using a first device, that a user is walking or running; determining whether a stride length of the user in a preset database needs to be calibrated, and if calibration is needed, collecting an actual movement distance of the user and requesting to obtain a quantity of movement steps of the user from the first device; and calculating, by the second device, an actual movement stride length of the user based on the quantity of movement steps of the user and the actual movement distance of the user, updating the stride length of the user in the preset database by using the actual movement stride length of the user, and sending the preset database to the first device.

According to a fourth aspect, a stride length calibration method is provided and is applied to a first device side. The method includes: detecting, by a first device, that a user is walking or running, collecting a quantity of movement steps of the user, receiving a request sent by the second device, responding to the request, and sending the quantity of movement steps of the user to the second device; and finally receiving, by the first device, a preset database sent by the second device.

Herein, the request is sent by the second device after detecting that the user is walking or running, and determining that a stride length of the user in the preset database needs to be calibrated.

In this embodiment of the present invention, the preset database may be used by the first device to calculate a movement distance of the user based on the stride length of the user in the preset database and the quantity of movement steps of the user.

The stride length calibration methods described in the third aspect and the fourth aspect may be implemented to perform stride length calibration on a stride length in a preset database by using an actual movement distance collected by the second device and an actual quantity of movement steps collected by the first device on the second device side that is equipped with a distance monitoring element, and send the calibrated preset database to the first device that is not equipped with a distance monitoring element, thereby improving accuracy of calculating the movement distance of the user by the first device. In addition, after calibration is complete, the first device can independently and accurately calculate the movement distance of the user.

With reference to the third aspect or the fourth aspect, the preset database may further include a movement status parameter of the user, where the movement status parameter of the user is corresponding to the stride length of the user. The movement status parameter of the user includes at least one of the following: a movement stride frequency, a movement type, or a movement environment in which the user is located. In some embodiments, the preset database may further include body feature information of the user, where the body feature information of the user is corresponding to the stride length of the user.

During specific implementation, when it is detected that the user is running or walking, the first device may further collect the movement status parameter of the user. The second device may request to obtain the movement status parameter of the user from the first device; obtain, through calculation based on an actual movement distance and a quantity of movement steps of the user in a movement status represented by a same movement status parameter, an actual stride length of the user in the movement status represented by the same movement status parameter; and finally update, by using the actual stride length obtained through calculation, a stride length that is in the preset database and that is of the user in the movement status represented by the same movement status parameter.

In some embodiments, the preset database may further include a latest calibration time corresponding to the stride length of the user. During specific implementation, the second device may determine whether a difference between the latest calibration time and a current time is greater than a preset time threshold; and if the difference is greater than the preset time threshold, it is determined that the stride length of the user needs to be calibrated; or if the difference is not greater than the preset time threshold, it is determined that the stride length of the user does not need to be calibrated.

In some embodiments, after the second device requests to obtain the actual quantity of movement steps of the user from the first device, the second device may further filter out invalid data from data that represents the actual quantity of movement steps of the user.

According to a fifth aspect, a stride length calibration method is provided and is applied to a second device side. The method includes: detecting, by a second device, that a user is walking or running; determining whether a stride length of the user in a preset database needs to be calibrated, and if calibration is needed, collecting an actual movement distance of the user, and collecting a quantity of movement steps of the user; and calculating, by the second device, an actual movement stride length of the user based on the quantity of movement steps of the user and the actual movement distance of the user, updating the stride length of the user in the preset database by using the actual movement stride length of the user, and sending the preset database to the first device.

According to a sixth aspect, a stride length calibration method is provided and is applied to a first device side. The method includes: receiving, by a first device, a preset database sent by the second device.

In this embodiment of the present invention, the preset database may be used by the first device to calculate a movement distance of the user based on the stride length of the user in the preset database and the quantity of movement steps of the user.

The stride length calibration methods described in the fifth aspect and the sixth aspect may be implemented to perform stride length calibration on a stride length in a preset database by using an actual movement distance collected by the second device and an actual quantity of movement steps collected by the second device on the second device side that is equipped with a distance monitoring element, and send the calibrated preset database to the first device that is not equipped with a distance monitoring element, thereby improving accuracy of calculating the movement distance of the user by the first device. In addition, after calibration is complete, the first device can independently and accurately calculate the movement distance of the user.

According to a seventh aspect, a mobile device is provided, where the mobile device is a first device, and may include a motion sensor, a processor, and a transceiver, where the motion sensor is configured to detect that a user is walking or running, and collect a quantity of movement steps of the user;

the processor is configured to determine whether a stride length of the user in a preset database needs to be calibrated, if calibration is needed;

the transceiver is configured to: if the processor determines that the stride length of the user in the preset database needs to be calibrated, request to obtain, from a second device, an actual movement distance of the user, where the second device is configured to collect the actual movement distance of the user, and the stride length of the user in the preset database is provided to the first device to calculate a movement distance of the user; and the processor is further configured to: calculate an actual stride length of the user based on the actual movement distance of the user and the quantity of movement steps of the user, and update the stride length of the user in the preset database by using the actual stride length obtained through calculation.

According to an eighth aspect, a mobile device is provided, where the mobile device is a second device, and may include a distance monitoring element and a transceiver, where the transceiver may be configured to receive a request sent by a first device;

the distance monitoring element may be configured to respond to the request, and collect an actual movement distance of the user; and the transceiver may be further configured to send the actual movement distance of the user to the first device.

In this embodiment of the present invention, the preset database may be used by the first device to calculate a movement distance of the user based on a stride length of the user in the preset database and the quantity of movement steps of the user.

With reference to the seventh aspect or the eighth aspect, the preset database may further include a movement status parameter of the user, where the movement status parameter of the user is corresponding to the stride length of the user. The movement status parameter of the user includes at least one of the following: a movement stride frequency, a movement type, or a movement environment in which the user is located. In some embodiments, the preset database may further include body feature information of the user, where the body feature information of the user is corresponding to the stride length of the user.

During specific implementation, the motion sensor may be further configured to collect the movement status parameter of the user when it is detected that the user is walking or running. The processor may be further configured to: obtain, through calculation based on an actual movement distance and a quantity of movement steps of the user in a movement status represented by a same movement status parameter, an actual stride length of the user in the movement status represented by the same movement status parameter; and update, by using the actual stride length obtained through calculation, a stride length that is in the preset database and that is of the user in the movement status represented by the same movement status parameter.

According to a ninth aspect, a mobile device is provided, where the mobile device is a second device, and may include a distance monitoring element and a transceiver, where the processor is configured to detect, by using a first device, that a user is walking or running;

the processor is further configured to determine whether a stride length of the user in a preset database needs to be calibrated;

the distance monitoring element is configured to: if the processor determines that the stride length of the user in the preset database needs to be calibrated, collect an actual movement distance of the user;

the transceiver is configured to request to obtain a quantity of movement steps of the user from the first device;

the processor is further configured to: calculate an actual movement stride length of the user based on the quantity of movement steps of the user and the actual movement distance of the user, and update the stride length of the user in the preset database by using the actual movement stride length of the user; and the transceiver is further configured to send the preset database to the first device, where the preset database is used by the first device to calculate the movement distance of the user based on the stride length of the user in the preset database and the quantity of movement steps of the user.

According to a tenth aspect, a mobile device is provided, where the mobile device is a first device, and may include a motion sensor, a processor, and a transceiver, where the motion sensor may be configured to detect that a user is walking or running, and collect a quantity of movement steps of the user;

the transceiver may be configured to: receive a request sent by the second device, respond to the request, and send the quantity of movement steps of the user to the second device; and the transceiver may be further configured to receive the preset database sent by the second device.

Herein, the request is sent by the second device after detecting that the user is walking or running, and determining that a stride length of the user in the preset database needs to be calibrated.

In this embodiment of the present invention, the preset database may be used by the first device to calculate a movement distance of the user based on the stride length of the user in the preset database and the quantity of movement steps of the user.

With reference to the ninth aspect or the tenth aspect, the preset database may further include a movement status parameter of the user, where the movement status parameter of the user is corresponding to the stride length of the user. The movement status parameter of the user includes at least one of the following: a movement stride frequency, a movement type, or a movement environment in which the user is located. In some embodiments, the preset database may further include body feature information of the user, where the body feature information of the user is corresponding to the stride length of the user.

During specific implementation, the transceiver may be further configured to: if the processor determines that the stride length of the user in the preset database needs to be calibrated, request to obtain the movement status parameter of the user from the first device, where the first device is configured to collect the movement status parameter of the user. The processor may be further configured to: obtain, through calculation based on an actual movement distance and a quantity of movement steps of the user in a movement status represented by a same movement status parameter, an actual stride length of the user in the movement status represented by the same movement status parameter; and update, by using the actual stride length obtained through calculation, a stride length that is in the preset database and that is of the user in the movement status represented by the same movement status parameter.

According to an eleventh aspect, a mobile device is provided, where the mobile device is a first device, and may include a function unit configured to implement the method in the first aspect.

According to a twelfth aspect, a mobile device is provided, where the mobile device is a second device, and may include a function unit configured to implement the method in the second aspect.

According to a thirteenth aspect, a mobile device is provided, where the mobile device is a first device, and may include a function unit configured to implement the method in the third aspect.

According to a fourteenth aspect, a mobile device is provided, where the mobile device is a second device, and may include a function unit configured to implement the method in the fourth aspect.

According to a fifteenth aspect, a stride length calibration system is provided, including: a first device and a second device, where the first device is configured to detect that a user is walking or running, and collect a quantity of movement steps of the user;

the first device is further configured to: determine whether a stride length of the user in a preset database needs to be calibrated, and if calibration is needed, request to obtain, from the second device, an actual movement distance of the user, where the stride length of the user in the preset database is provided to the first device to calculate a movement distance of the user;

the second device is configured to collect the actual movement distance of the user; and the first device is further configured to: calculate an actual stride length of the user based on the actual movement distance of the user and the quantity of movement steps of the user, and update the stride length of the user in the preset database by using the actual stride length obtained through calculation.

According to a sixteenth aspect, a stride length calibration system is provided, including: a first device and a second device, where the first device is configured to detect that a user is walking or running, and collect a quantity of movement steps of the user;

the second device is configured to: after the first device detects that the user is walking or running, determine whether a stride length of the user in a preset database needs to be calibrated, and if calibration is needed, collect an actual movement distance of the user and request to obtain the quantity of movement steps of the user from the first device, where the stride length of the user in the preset database is provided to the first device to calculate a movement distance of the user;

the second device is further configured to: calculate an actual movement stride length of the user based on the quantity of movement steps of the user and the actual movement distance of the user, and update the stride length of the user in the preset database by using the actual movement stride length of the user; and the second device is further configured to send the preset database to the first device.

According to a seventeenth aspect, a readable non-volatile storage medium storing a computer instruction is provided, where the computer instruction is executed to implement the method described in the first aspect.

According to an eighteenth aspect, a readable non-volatile storage medium storing a computer instruction is provided, where the computer instruction is executed to implement the method described in the second aspect.

According to a nineteenth aspect, a readable non-volatile storage medium storing a computer instruction is provided, where the computer instruction is executed to implement the method described in the third aspect.

According to a twentieth aspect, a readable non-volatile storage medium storing a computer instruction is provided, where the computer instruction is executed to implement the method described in the fourth aspect.

The embodiments of the present invention may be implemented to perform stride length estimation and calibration on a device that is not equipped with a distance monitoring element, thereby improving accuracy of calculating a movement distance of a user by the device. In addition, after calibration is complete, the device can independently and accurately calculate the movement distance of the user.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Terms used in an implementation part of the present invention are merely used to describe specific embodiments of the present invention, but are not intended to limit the present invention.

Figure 1:
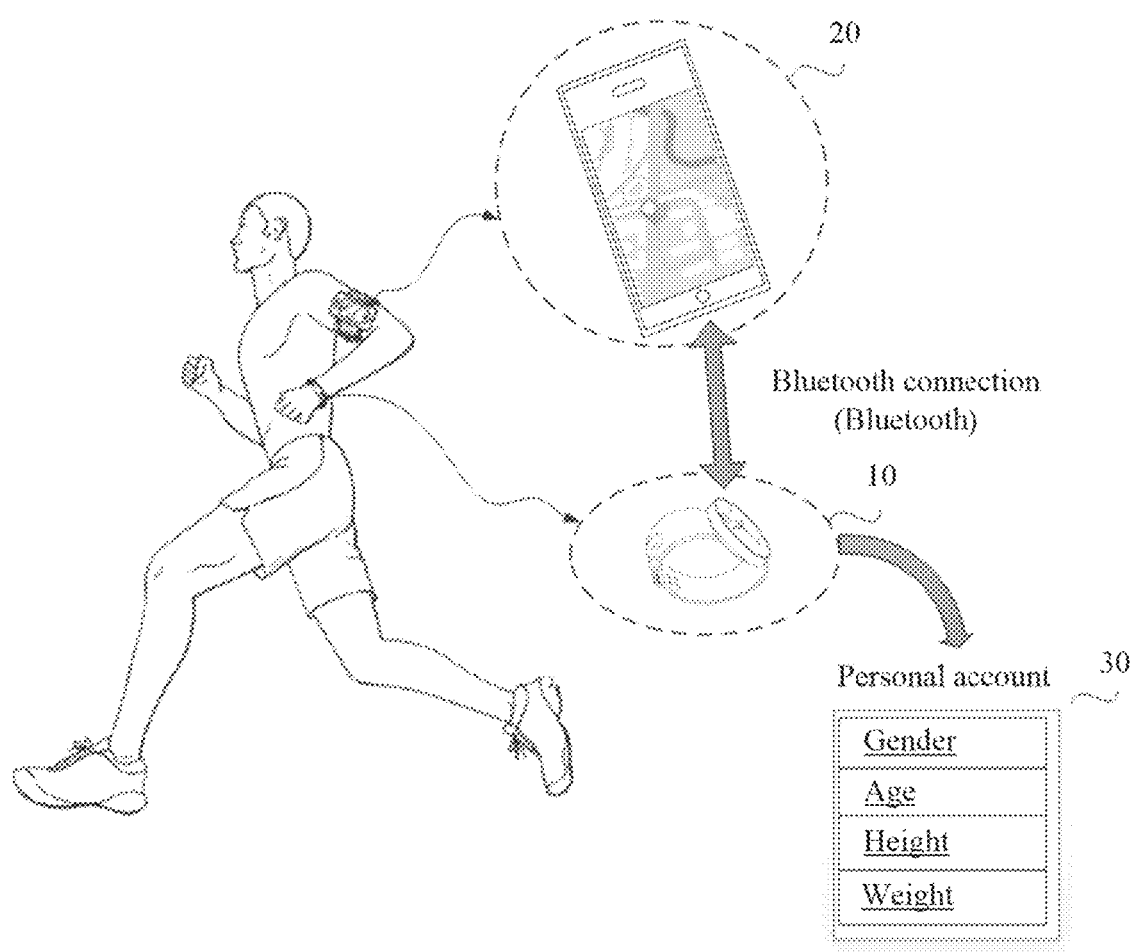
FIG. 1 is a schematic diagram of an application scenario used in an embodiment of the present invention.

FIG. 1 is a schematic diagram of an application scenario used in an embodiment of the present invention. As shown in FIG. 1, a user carries both a wearable device 10 and a smartphone 20 while running or walking.

The smartphone 20 is equipped with a distance monitoring element, and can directly measure an actual movement distance of the user. During specific implementation, the distance monitoring element may be a GPS module, can directly measure the actual movement distance of the user by using a satellite positioning system, and may be mainly used in an outdoor open environment. In some embodiments, the distance monitoring element may be an RF (Radio Frequency, Chinese: radio frequency) positioning module, for example, a Wi-Fi positioning module or a 3G positioning module; and may be mainly configured to perform positioning on the user in an indoor environment, and measure the actual movement distance of the user.

The wearable device 10 is not equipped with the distance monitoring element, and cannot directly measure the actual movement distance of the user. The wearable device 10 is equipped with a motion sensor, for example, an accelerometer, a gyroscope, or a magnetometer, can identify a movement status (walking or running), a stride frequency, a movement environment, and the like of the user, and can collect statistics about a quantity of movement steps of the user. In some embodiments, the wearable device 10 may further collect statistics about another body feature parameter of the user, such as a heartbeat, a respiratory rate, or the like.

In this embodiment of the present invention, a wireless communication connection, for example, a Bluetooth connection, may exist between the wearable device 10 and the smartphone 20, and may be used to implement data communication between the two devices.

In this embodiment of the present invention, the wearable device 10 side may be configured with a stride length estimation model used for estimating a movement stride length of a user and a preset database. A variable of the stride length estimation model may be an influencing factor of a stride length. The preset database may be used to record a mapping relationship between the influencing factor and the stride length.

In this embodiment of the present invention, the influencing factor of the stride length may include one or more of the following: body feature information (for example, a gender, a height, a weight, and an age), a movement type (walking or running), a stride frequency (that is, a quantity of movement steps per unit time), a movement environment (a flat road, a slope, or the like), and the like of the user. The movement type, the stride frequency, and the movement environment may be generically referred to as a movement status parameter that is used to indicate a movement status of a user. Generally, a stride length of a taller person is longer than a stride length of a shorter person, a stride length of a man is longer than a stride length of a woman, a stride length of a young person is longer than a stride length of an old person, and a stride length of a person with a moderate size is longer than a stride length of an obese person. Generally, when a user runs fast, a stride length is longer, and when the user runs slowly, a stride length is shorter. When the user walks fast, a stride length is longer, and when the user walks slowly, a stride length is shorter. In actual application, the factors that affect the stride length may further include another factor, such as a heartbeat during movement or a respiratory rate during movement. This is not limited herein.

During specific implementation, the wearable device 10 may collect the foregoing movement status parameter by using the motion sensor. For the foregoing movement type, the motion sensor may determine a difference between walking and running. Generally, when a person is running, upper amplitude and lower amplitude that are perpendicular to a ground and that are of the body of the person are relatively large. For the foregoing stride frequency, the motion sensor may determine a quantity of movement steps of the user per unit time. A larger quantity of movement steps per unit time indicate a higher stride frequency, and a smaller quantity of movement steps per unit time indicate a lower stride frequency. For the foregoing movement environment, the motion sensor may determine a difference of the body of the person in different movement environments. For example, a difference between a movement status of the body of the person walking on the flat road and a movement status of the body of the person on the slope may be obtained through statistical analysis based on a large quantity of empirical data. This example is merely an implementation of this embodiment of the present invention. Specific implementation of obtaining the movement status parameter by using the motion sensor is not limited in this embodiment of the present invention.

During specific implementation, the wearable device 10 may be configured to display an interface 30. The user may enter body feature information of the user on the interface 30, for example, a gender, a height, and a weight.

The two influencing factors: height and stride frequency, are used as an example. The stride length estimation model used in this embodiment of the present invention may be represented as step=f(height, pedospeed), where step represents a stride length, height represents a height of a user, and pedospeed represents a movement stride frequency (a unit may be steps/minute) of the user. A function f may be used to map a corresponding stride length based on the height and the movement stride frequency.

Specifically, the function f may be represented as:

$$f(\text{height}, \text{pedospeed}) = a * \text{pedospeed}^m + b * \text{height}^n + c$$

a and b represent weights of factors, m and n represent indexes of the factors, and c represents an adjustment increment. During specific implementation, a machine learning algorithm may be used to obtain values of a, b, m, n, and c through training. During training, a large quantity of known stride frequencies and known heights are used as input, and an actual stride length corresponding to the known stride frequency and the known height is used as output.

It should be noted that stride length estimation is not limited to the foregoing algorithm expression. The stride length estimation model f may be another model used to estimate a stride length. This is not limited herein. In addition, the two influencing factors: height and stride frequency, are not limited. An independent variable of the function f may include more or fewer factors that affect the stride length, that is, the stride length estimation model may be used to estimate the stride length from more or fewer dimensions.

Figure 2:
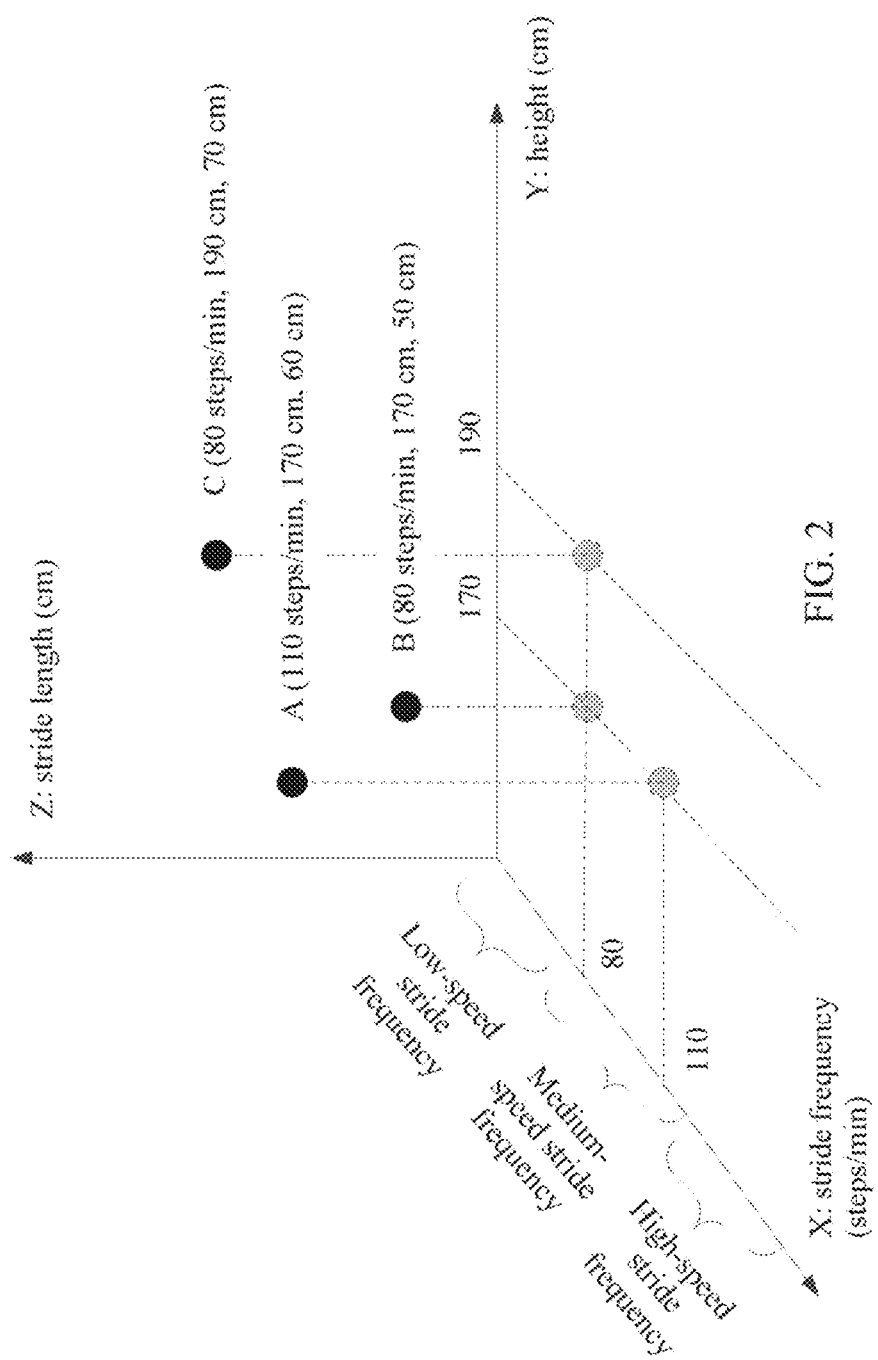
FIG. 2 is a schematic diagram of a database that includes an estimated stride length of a user according to an embodiment of the present invention.

Two influencing factors: height and stride frequency, are used as an example. The preset database used in this embodiment of the present invention may be shown in FIG. 2. An x-axis represents a movement stride frequency of a user, a y-axis represents a height of the user, and a z-axis represents a stride length of the user. As shown in FIG. 2, the height and the stride frequency jointly affect the stride length. A mapping relationship represented by the stride length estimation model exists between the stride length and a combination of the height and the stride frequency.

Specifically, for a single user whose height is fixed (for example, the height is 170 centimeters), a higher movement stride frequency of the user indicates a longer stride length of the user. For example, a coordinate point A in the diagram indicates that when a movement stride frequency of a user with a height of 170 centimeters is 110 steps per minute (steps/minute), a stride length of the user is estimated to be 60 centimeters by using the foregoing stride length estimation model. A coordinate point B in the diagram indicates that when a movement stride frequency of a user with a height of 170 centimeters is 80 steps per minute (steps/minute), a stride length of the user is estimated to be 50 centimeters by using the foregoing stride length estimation model. This example is merely used to describe this embodiment of the present invention, and shall not be construed as a limitation.

Specifically, for two or more users with a same stride frequency, a stride length of a taller user is longer. For example, the coordinate point B in the diagram indicates that when a movement stride frequency of a user with a height of 170 centimeters is 80 steps per minute (steps/minute), a stride length of the user is estimated to be 50 centimeters by using the foregoing stride length estimation model. A coordinate point C in the diagram indicates that when a movement stride frequency of a user with a height of 190 centimeters is 80 steps per minute (steps/minute), a stride length of the user is estimated to be 70 centimeters by using the foregoing stride length estimation model. This example is merely used to describe this embodiment of the present invention, and shall not be construed as a limitation.

It should be noted that the preset database is not limited to that shown in FIG. 2, and may further reflect more or fewer mapping relationships between stride length influencing factors and stride lengths.

In this embodiment of the present invention, the preset database may be established or initialized in the following manners.

Manner 1: The preset database configured on a wearable device 10 side may be applicable to any possible user. It should be understood that body feature information (for example, a height) of a human being is in a limited reasonable range, and may be listed one by one. A movement status (for example, a movement stride frequency) of the human being is also in a limited reasonable range, and may also be listed one by one. Therefore, the wearable device 10 may estimate, based on the stride length estimation model, corresponding stride lengths of all possible users (with different body features) in different movement statuses, and correspondingly fills estimated stride lengths, and body feature information and movement statuses that are corresponding to the stride lengths into the preset database. That is, the preset database may include corresponding stride lengths that are of all possible users (with different body features) in different movement statuses and that are estimated by using the stride length estimation model. In this case, when any user wears the wearable device 10 while running or walking, the wearable device 10 can estimate a corresponding stride length.

Manner 2: The preset database configured on the wearable device 10 side may be applicable only to a user of the wearable device 10. During specific implementation, the wearable device 10 may receive, by using the interface 30, body feature information (for example, the height) entered by the user. When the user wears the wearable device 10 while running or walking, the wearable device 10 may identify a movement status of the user (for example, a movement stride frequency), uses the body feature information and the movement status that are of the user to estimate a stride length of the user in the movement status based on the stride length estimation model, and correspondingly fills the estimated stride length, and the body feature information and the movement status that are corresponding to the stride length into the preset database. That is, the preset database may be empty at an initial moment. The wearable device 10 may continuously fill the preset database in a process in which the user uses the wearable device 10, so that a volume of data managed by the preset database may be reduced.

In the foregoing second manner, alternatively, the wearable device 10 may obtain the preset database for the user from a server after receiving the body feature information entered by the user by using the interface 30. Specifically, the server may be a service platform of the wearable device 10, and may be configured to manage corresponding stride lengths that are of all possible users (with different body features) in different movement statuses and that are estimated by using the stride length estimation model. The preset database obtained from the server may be specifically represented as a table, and the table records corresponding stride lengths of the user in different movement statuses. Reference may be made to the subsequent Table 1.

In some embodiments, a stride frequency in the preset database may further be roughly divided into several stride frequency ranges, which specifically may be a high-speed stride frequency, a medium-speed stride frequency, and a low-speed stride frequency shown in FIG. 2. During specific implementation, a movement distance of the user may be estimated by using an average stride length corresponding to one stride frequency range.

For example, it is assumed that a stride frequency range corresponding to the low-speed stride frequency is 40 steps/minute to 60 steps/minute, and there are 100 discrete stride frequency values $A_1$-$A_{100}$ in the range. In this case, an average stride length A corresponding to the low-speed stride frequency is $$A = \frac{\sum_{i=1}^{i=100} A_i}{100}.$$

When the wearable device 10 detects that the user is in a low-speed running status, the wearable device 10 may estimate a movement distance of the user L=A*N based on the average stride length A corresponding to the low-speed stride frequency, and a quantity N of movement steps of the user, where A is greater than 0, L is greater than 0, and N is a positive integer. It should be noted that this example is merely used to describe this embodiment of the present invention, and shall not be construed as a limitation.

It may be understood that the stride lengths in the preset database are estimated values obtained by using the stride length estimation model, and cannot accurately reflect actual stride lengths of the user. Consequently, a movement distance obtained through calculation by using the stride lengths in the preset database is inaccurate. As shown in FIG. 1, the user wears both the wearable device 10 and the smartphone 20 while running, and the wearable device 10 calculates, by multiplying the stride lengths in the preset database by a quantity of movement steps, that a movement distance of the user is L1. However, the smartphone 20 directly measures, by using the GPS, that a movement distance of the user is L2, and there is usually a deviation between L2 and L1.

To improve accuracy of calculating the movement distance of the user by a wearable device 10, an embodiment of the present invention provides a stride length calibration method, so as to perform stride length estimation calibration on a device that is not equipped with a distance monitoring element (for example, the wearable device 10), thereby improving accuracy of calculating the movement distance of the user by the device. In addition, after calibration is complete, the device can independently and accurately calculate the movement distance of the user.

A main principle behind this embodiment of the present invention includes: using distance data collected by a device that is equipped with a distance monitoring element (for example, the foregoing smartphone 20, hereinafter referred to as a second device), to calibrate a stride length in the preset database on a device (for example, the foregoing wearable device 10, hereinafter referred to as a first device) side that is not equipped with the distance monitoring element. In addition, after calibration is complete, the first device can independently and accurately calculate the movement distance of the user by using the stride length in the preset database.

With reference to accompanying drawings, the following describes in detail the stride length calibration method provided in this embodiment of the present invention.

Figure 3:
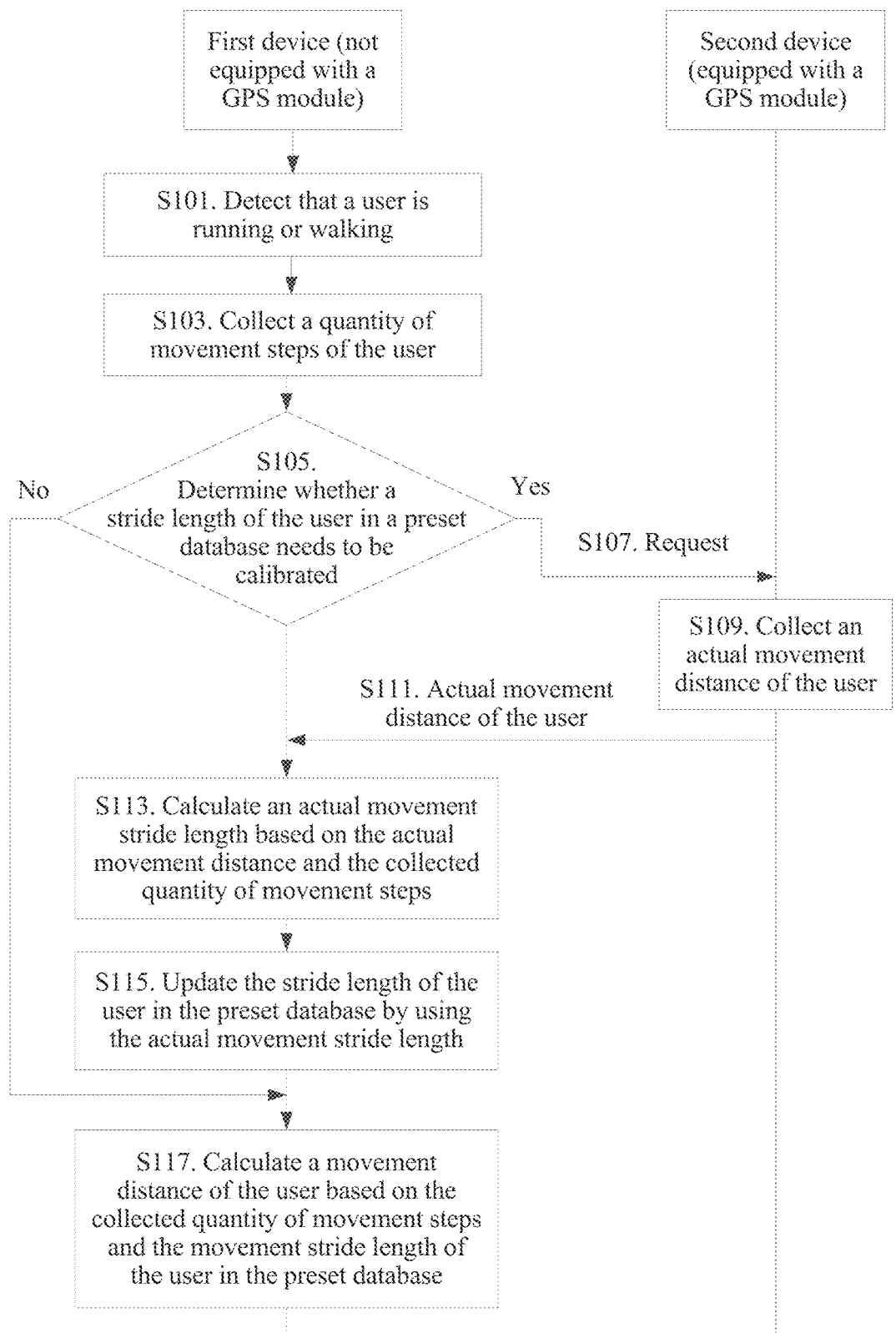
FIG. 3 is a schematic flowchart of a stride length calibration method according to an embodiment of the present invention.

FIG. 3 is a stride length calibration method according to an embodiment of the present invention. In the embodiment in FIG. 3, the first device uses the distance data collected by the second device (equipped with a distance monitoring element, for example, a GPS module or an RF positioning module), to calibrate the stride length in the preset database on the first device side, and calculates the movement distance of the user based on the stride length in the preset database after calibration is complete. Description is provided below.

S101. The first device detects that a user is running or walking. Specifically, the first device may be equipped with a motion sensor, for example, an accelerometer, a gyroscope, or a magnetometer. The first device may identify whether a movement type of the user is running or walking.

S103. The first device collects a quantity of movement steps of the user. Specifically, the first device may collect statistics about the quantity of movement steps of the user by using the motion sensor.

S105. The first device determines whether a stride length of the user in a preset database needs to be calibrated. Specifically, if calibration is needed, S107 to S111 are performed; or if calibration is not needed, S117 is performed.

In this embodiment of the present invention, the preset database may be configured in the first device, and is used by the first device to estimate the movement distance of the user by using the stride length in the preset database. For description and implementation of the preset database, reference may be made to FIG. 2 and related content, and details are not described herein again.

S107 to S111. The first device requests to obtain, from the second device, an actual movement distance of the user. Specifically, the second device may be equipped with a distance monitoring element, and is configured to collect the actual movement distance of the user.

During specific implementation, the first device may send a request to the second device to request to obtain the actual movement distance of the user; and reference may be made to S107. Correspondingly, the second device receives the request, responds to the request, and collects the actual movement distance of the user. Reference may be made to S109. Then, the second device sends the collected actual movement distance of the user to the first device; and reference may be made to S111.

It should be understood that, in this embodiment of the present invention, the user needs to carry the first device and the second device while running or walking. The first device may be configured to monitor a movement status of the user. The second device may be triggered by the first device to enable the GPS, and collect the actual movement distance of the user. In this way, the user does not need to manually enable the GPS of the second device, thereby saving a user operation and avoiding unnecessary power consumption.

It should be understood that a communication connection exists between the first device and the second device, for example, a Bluetooth communication connection, so that data communication between the first device and the second device is implemented.

S113. After obtaining the actual movement distance that is of the user and that is collected by the second device, the first device calculates an actual movement stride length of the user based on the actual movement distance and the collected quantity of movement steps. Specifically, the actual movement stride length=the actual movement distance÷the quantity of movement steps.

S115. The first device updates the stride length of the user in the preset database by using the actual movement stride length. It may be understood that the updated stride length of the user in the preset database is the actual stride length of the user, and using the updated stride length in the preset database to calculate the movement distance of the user may improve accuracy of a result.

S117. The first device calculates a movement distance of the user based on the collected quantity of movement steps and the movement stride length of the user in the preset database.

The following describes in detail the stride length calibration process described in the foregoing S105 to S115.

It can be learned from the foregoing content that the preset database used in this embodiment of the present invention may include a movement status parameter of the user in addition to the stride length of the user. The movement status parameter of the user is used to represent a movement status of the user, and may specifically include at least one of the following: a movement type (running or walking), a stride frequency, or a movement environment in which the user is located (for example, a flat road or a slope).

During specific implementation, when it is detected that the user is running or walking, the first device may further obtain the movement status parameter. Specifically, the first device may collect the movement status parameter of the user by using the motion sensor. For information about obtaining of body feature information of the user, reference may be made to FIG. 1 and related content, and details are not described herein.

During specific implementation, in the preset database, one group of movement status parameters is corresponding to one stride length. For example, the stride length of the user in the preset database may be shown in Table 1.

TABLE 1

|  | Movement Status | | | |
| --- | --- | --- | --- | --- |
|  | Low-speed Walking | High-speed Walking | Low-speed Running | High-speed Running |
| Stride Length (centimeters) | 30 | 45 | 40 | 60 |

It should be understood that, for a single user (body feature information such as a height and a weight is fixed), a stride length of the user is determined by a movement status of the user. It can be learned from the foregoing content that the preset database may include corresponding stride lengths of a plurality of users in different movement statuses, and may even include corresponding stride lengths of all possible users (with different body features) in different movement statuses, so that the first device is applicable to more users.

It should be noted that Table 1 is merely an implementation provided in this embodiment of the present invention, and shall not be construed as a limitation. In this embodiment of the present invention, specific stride frequencies respectively corresponding to "low-speed walking", "high-speed walking", "low-speed running", and "high-speed running" in Table 1 are not limited, and may be defined based on an actual situation. During specific implementation, the movement status of the user may be further divided. This is not limited to the four movement statuses in Table 1.

In this embodiment of the present invention, the preset database may further include a latest calibration time corresponding to the stride length of the user, and the latest calibration time is used to indicate a latest update time of the stride length of the user. During specific implementation, the first device may determine whether a difference between the latest calibration time and a current time is greater than a preset time threshold; and if the difference is greater than the preset time threshold, it is determined that the stride length of the user needs to be calibrated; or if the difference is not greater than the preset time threshold, it is determined that the stride length of the user does not need to be calibrated.

For example, it is assumed that the preset time threshold is 15 days, and the stride length of the user is shown in Table 1. If a latest update time of a corresponding stride length of the user in the "low-speed walking" status is "Sep. 1, 2016", and a time span between the latest update time and a current time "Oct. 1, 2016" is 30 days, in this case, the first device may determine that the corresponding stride length of the user in the "low-speed walking" status needs to be calibrated. This example is merely used to describe this embodiment of the present invention, and shall not be construed as a limitation.

In some embodiments, alternatively, the first device may trigger calibration of the preset database based on an instruction of the user. That is, alternatively, whether the stride length of the user in the preset database needs to be calibrated may be determined by the user.

It should be noted that, alternatively, the first device may determine, based on another condition, whether the stride length of the user in the preset database needs to be calibrated. For example, alternatively, the first device may trigger calibration of the preset database when a total running mileage of the user reaches a preset mileage value (for example, 500 kilometers). It may be understood that when the total running mileage of the user reaches the preset mileage value (for example, 500 kilometers), it may indicate that a movement capability of the user is significantly improved and a movement stride length may change (for example, become longer). In this embodiment of the present invention, a condition for triggering calibration of the preset database is not limited.

In this embodiment of the present invention, if the stride length of the user in the preset database needs to be calibrated, the first device may request to obtain, from the second device, the actual movement distance of the user; and reference may be made to S107 to S111. During specific implementation, the second device may send distance data to the first device at regular intervals (for example, one minute). For example, the distance data that is received by the first device and that represents the actual movement distance may be shown in Table 2.

TABLE 2

|  | Time (minutes) | | | | | | |
| --- | --- | --- | --- | --- | --- | --- | --- |
|  | [0, 1) | [1, 2) | [2, 3) | . . . | [30, 31) | . . . | [59, 60) |
| Movement Status | Low-speed Running | High-speed Running | High-speed Running | High-speed Running | High-speed Walking | High-speed Walking | Slow Walking |
| A Quantity of Steps | 300 | 500 | 505 | 510 | 250 | 250 | 100 |
| Distance Data (meters) | 150 | 300 | 320 | 350 | 140 | 140 | 80 |

It can be learned from Table 2 that the first device detects, by using the motion sensor, that the user is in a movement status of low-speed running within the first minute, and a movement distance that is of the user within the first minute and that is collected by the second device is 150 meters. Likewise, the first device may further detect, by using the motion sensor, a movement status of the user at another time (for example, the second minute or the third minute), and the second device may further collect a movement distance of the user within the another time.

It should be noted that Table 2 is merely used to describe this embodiment of the present invention, and shall not be construed as a limitation.

In this embodiment of the present invention, based on the actual movement distance obtained from the second device, the first device may specifically calculate the actual movement stride length of the user and update the stride length of the user in the preset database by performing the following steps.

Step 1: The first device obtains, through calculation based on an actual movement distance and a quantity of movement steps of the user in a movement status represented by a same movement status parameter, an actual stride length of the user in the movement status represented by the same movement status parameter.

For example, it is assumed that the actual movement distance obtained by using the second device is shown in Table 2. In this case, the first device may divide the actual movement distance (for example, 150 meters within the first minute) corresponding to the "low-speed running" by the quantity of steps (for example, 300 steps within the first minute) corresponding to the "low-speed running" to obtain an actual stride length of the user in the movement status of "low-speed running", that is, 50 centimeters. Likewise, the first device may divide the actual movement distance (for example, 300 meters within the second minute) corresponding to the "high-speed running" by the quantity of steps (for example, 500 steps within the second minute) corresponding to the "high-speed running" to obtain an actual stride length of the user in the movement status of "high-speed running", that is, 60 centimeters. Likewise, the first device may obtain actual stride lengths of the user respectively during the "low-speed walking" and the "high-speed walking", and details are not described herein again. This example is merely used to describe this embodiment of the present invention, and shall not be construed as a limitation.

In actual application, alternatively, the first device may collect statistics about actual movement distances and quantities of movement steps in a same movement status, and then calculate an actual stride length by using a total actual movement distance and a total quantity of movement steps in the same status. For example, as shown in FIG. 2, the first device may collect statistics about a total actual movement distance (that is, a total distance from the second minute to the fifty-ninth minute) of the user during the "high-speed running" and a total quantity of steps (for example, a total quantity of steps from the second minute to the fifty-ninth minute) during the "high-speed running", and then divide the total actual movement distance by the total quantity of steps to obtain an actual stride length of the user in the movement status of "high-speed running". This example is merely used to describe this embodiment of the present invention, and shall not be construed as a limitation.

It may be understood that the actual stride length that is obtained through calculation by performing Step 1 more truly reflects a true stride length of the user in each movement status.

Step 2: The first device updates, by using the actual stride length obtained through calculation, a stride length that is in the preset database and that is of the user in the movement status represented by the same movement status parameter.

For example, it is assumed that the stride lengths that are of the user in various movement statuses and that are in the preset database are shown in Table 1. In this case, the first device may update the stride length (that is, 40 centimeters) corresponding to the "low-speed running" to an actual stride length (that is, 50 centimeters) obtained through calculation. Likewise, the first device may use the actual stride lengths that are obtained through calculation and that are of the user respectively in the three movement statuses: "high-speed running", "low-speed walking", and "high-speed walking", to correspondingly update the stride lengths corresponding to the "high-speed running", the "low-speed walking", and the "high-speed walking" in Table 1. Details are not described herein again.

It may be understood that calibrating a stride length of the user in the preset database may improve accuracy of calculating a movement distance of the user by the first device. In addition, after calibration is complete, the first device can independently (without relying on the second device) calculate the movement distance of the user.

In some embodiments, to ensure accuracy of stride length calibration, for distance data that represents the actual movement distance and that is obtained from the second device, the first device may preprocess the distance data to filter out invalid data. Herein, the invalid data is data that does not comply with a natural law or common sense. For example, a movement distance of 1,000 meters within one minute is far beyond a limit of a human being. This example is merely used to describe this embodiment of the present invention, and shall not be construed as a limitation.

Figure 4:
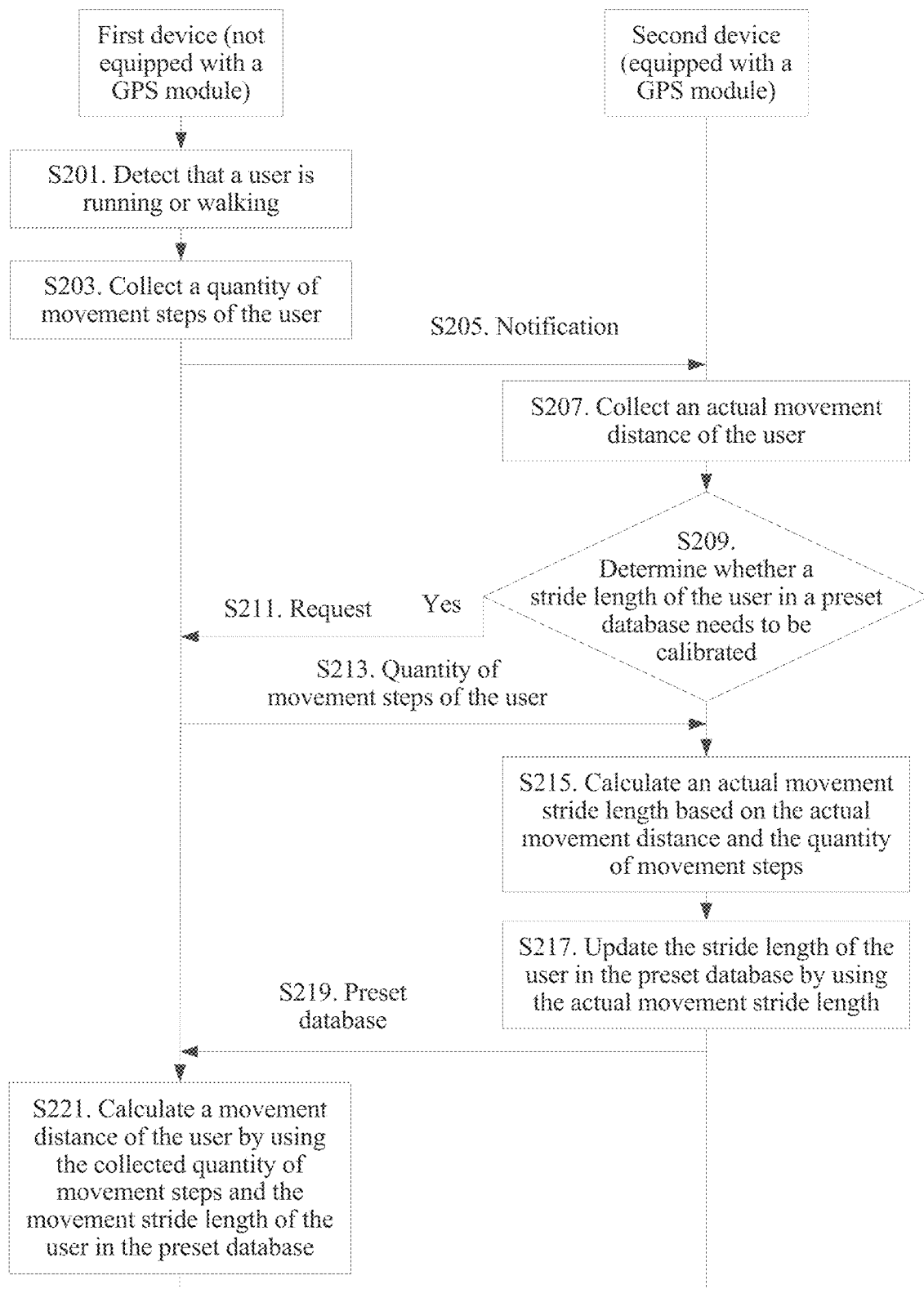
FIG. 4 is a schematic flowchart of another stride length calibration method according to an embodiment of the present invention.

FIG. 4 is another stride length calibration method according to an embodiment of the present invention. A main difference between the embodiment in FIG. 4 and the embodiment in FIG. 3 is that, in the embodiment in FIG. 4, an execution body of the stride length calibration process is the second device (equipped with a distance monitoring element), and the second device sends the preset database to the first device after calibration is complete, so that the first device calculates a movement distance of a user based on a stride length in the preset database. Description is provided below.

S201 to S205. The second device detects that the user is walking or running.

In an implementation, the second device may detect, by using the first device, that the user is walking or running. The first device detects, by using a motion sensor, that a user is running or walking; and reference may be made to S201. Then, the first device may send a notification to the second device, so as to notify the second device that the user is walking or running. Reference may be made to S205. During specific implementation, after detecting that the user is walking or running, the first device may collect statistics about a quantity of movement steps of the user by using the motion sensor; and reference may be made to S203.

In another implementation, the second device may be equipped with a motion sensor, and may be configured to directly detect, by using the motion sensor, that the user is walking or running.

S207. The second device determines whether a stride length of the user in a preset database needs to be calibrated. Specifically, if calibration is needed, S209 and S211 to S213 are performed.

During specific implementation, the second device and the first device each may be configured with the preset database, and the second device and the first device synchronously maintain the preset database. For description and implementation of the preset database, reference may be made to FIG. 2 and related content, and details are not described herein again. For specific implementation of determining whether a stride length of the user in a preset database needs to be calibrated, reference may be made to related content in the embodiment in FIG. 3, and details are not described herein again.

S209. The second device collects an actual movement distance of the user. Specifically, the second device may collect the actual movement distance of the user by using a distance monitoring module.

S211 to S213. The second device obtains a quantity of movement steps of the user.

In an implementation, the second device may request to obtain the quantity of movement steps of the user from the first device. The first device may be equipped with a motion sensor, and may be configured to collect the quantity of movement steps of the user. During specific implementation, the second device may send a request to the first device to request to obtain the quantity of movement steps of the user; and reference may be made to S211. Correspondingly, the first device receives the request, responds to the request, and sends the collected quantity of movement steps of the user to the second device; and reference may be made to S213.

In another implementation, the second device may be equipped with a motion sensor, and may be configured to directly collect the quantity of movement steps of the user by using the motion sensor.

During specific implementation, the first device may send the quantity of movement steps of the user to the second device at regular intervals (for example, one minute). For example, the quantity of movement steps received by the second device may be shown in Table 2. In some embodiments, to ensure accuracy of stride length calibration, for data that represents the quantity of movement steps of the user and that is obtained from the first device, the first device may preprocess the data to filter out invalid data. Herein, the invalid data is data that does not comply with a natural law or common sense. For example, 100 steps within one second are far beyond a limit of a human being. This example is merely used to describe this embodiment of the present invention, and shall not be construed as a limitation.

It should be understood that a communication connection exists between the first device and the second device, for example, a Bluetooth communication connection, so that data communication between the first device and the second device is implemented.

S215. After obtaining the quantity of movement steps that is of the user and that is collected by the first device, the second device may calculate an actual movement stride length of the user based on the quantity of movement steps of the user and the actual movement distance of the user. Specifically, the actual movement stride length=the actual movement distance÷the quantity of movement steps.

S217. The second device may update the stride length of the user in the preset database by using the actual movement stride length.

S219. After updating the preset database, the second device may send the preset database to the first device, so that the first device may calculate the movement distance of the user based on the updated stride length of the user in the preset database, thereby improving accuracy of calculating the movement distance of the user by the first device.

S221. Correspondingly, the first device updates the stride length of the user in the preset database by using the actual movement stride length. It may be understood that the updated stride length of the user in the preset database is the actual stride length of the user, and using the updated stride length in the preset database to calculate the movement distance of the user may improve accuracy of a result.

It can be learned from the foregoing content that the preset database used in this embodiment of the present invention may include a movement status parameter of the user in addition to the stride length of the user. Specifically, reference may be made to the embodiment in FIG. 2 and the embodiment in FIG. 3, and details are not described herein again.

During specific implementation, alternatively, when detecting, by using the first device, that the user is running or walking, the second device may request to obtain the movement status parameter of the user from the first device. In some embodiments, the second device may be equipped with a motion sensor, and may directly collect the movement status parameter of the user by using the motion sensor instead of the first device.

In this embodiment of the present invention, based on the quantity of movement steps that is of the user and that is obtained from the first device, the second device may specifically calculate the actual movement stride length of the user and update the stride length of the user in the preset database by performing the following steps.

Step 1: The second device obtains, through calculation based on an actual movement distance and a quantity of movement steps of the user in a movement status represented by a same movement status parameter, an actual stride length of the user in the movement status represented by the same movement status parameter.

For example, it is assumed that the quantity of movement steps that is of the user and that is obtained by using the first device is shown in Table 2. In this case, the second device may divide the actual movement distance (150 meters within the first minute) corresponding to the "low-speed running" by the quantity of steps (for example, 300 steps within the first minute) corresponding to the "low-speed running" to obtain an actual stride length of the user in the movement status of "low-speed running", that is, 50 centimeters. Likewise, the second device may divide the actual movement distance (for example, 300 meters within the second minute) corresponding to the "high-speed running" by the quantity of steps (for example, 500 steps within the second minute) corresponding to the "high-speed running" to obtain an actual stride length of the user in the movement status of "high-speed running", that is, 60 centimeters. Likewise, the second device may obtain actual stride lengths of the user respectively during the "low-speed walking" and the "high-speed walking", and details are not described herein again.

In actual application, alternatively, the second device may collect statistics about actual movement distances and quantities of movement steps in a same movement status, and then calculate an actual stride length by using a total actual movement distance and a total quantity of movement steps in the same status. For example, as shown in FIG. 2, the second device may collect statistics about a total actual movement distance (that is, a total distance from the second minute to the fifty-ninth minute) of the user during the "high-speed running" and a total quantity of steps (for example, a total quantity of steps from the second minute to the fifty-ninth minute) during the "high-speed running", and then divide the total actual movement distance by the total quantity of steps to obtain an actual stride length of the user in the movement status of "high-speed running". This example is merely used to describe this embodiment of the present invention, and shall not be construed as a limitation.

It may be understood that the actual stride length that is obtained through calculation by performing Step 1 more truly reflects a true stride length of the user in each movement status.

Step 2: The second device updates, by using the actual stride length obtained through calculation, a stride length that is in the preset database and that is of the user in the movement status represented by the same movement status parameter.

It may be understood that calibrating a stride length of the user in the preset database may improve accuracy of calculating a movement distance of the user by the first device by using the preset database. In addition, after calibration is complete, the first device can independently (without relying on the second device) calculate the movement distance of the user.

It should be noted that, for content not mentioned in the embodiment in FIG. 4, reference may be made to the embodiment in FIG. 3, and details are not described herein again.

Figure 5:
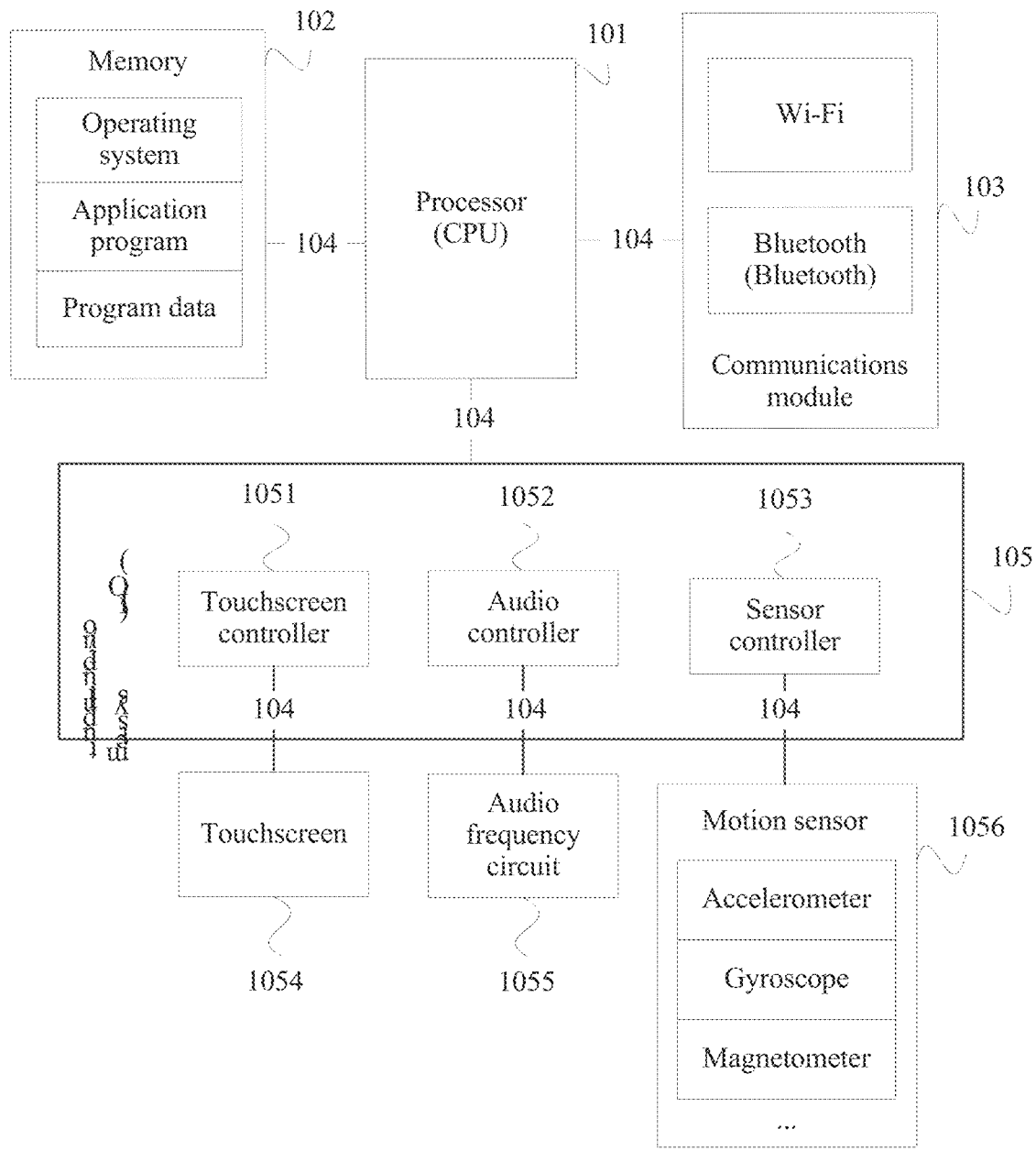
FIG. 5 is a schematic diagram of a hardware architecture of a device that is not equipped with a distance monitoring element according to an embodiment of the present invention.
Figure 6:
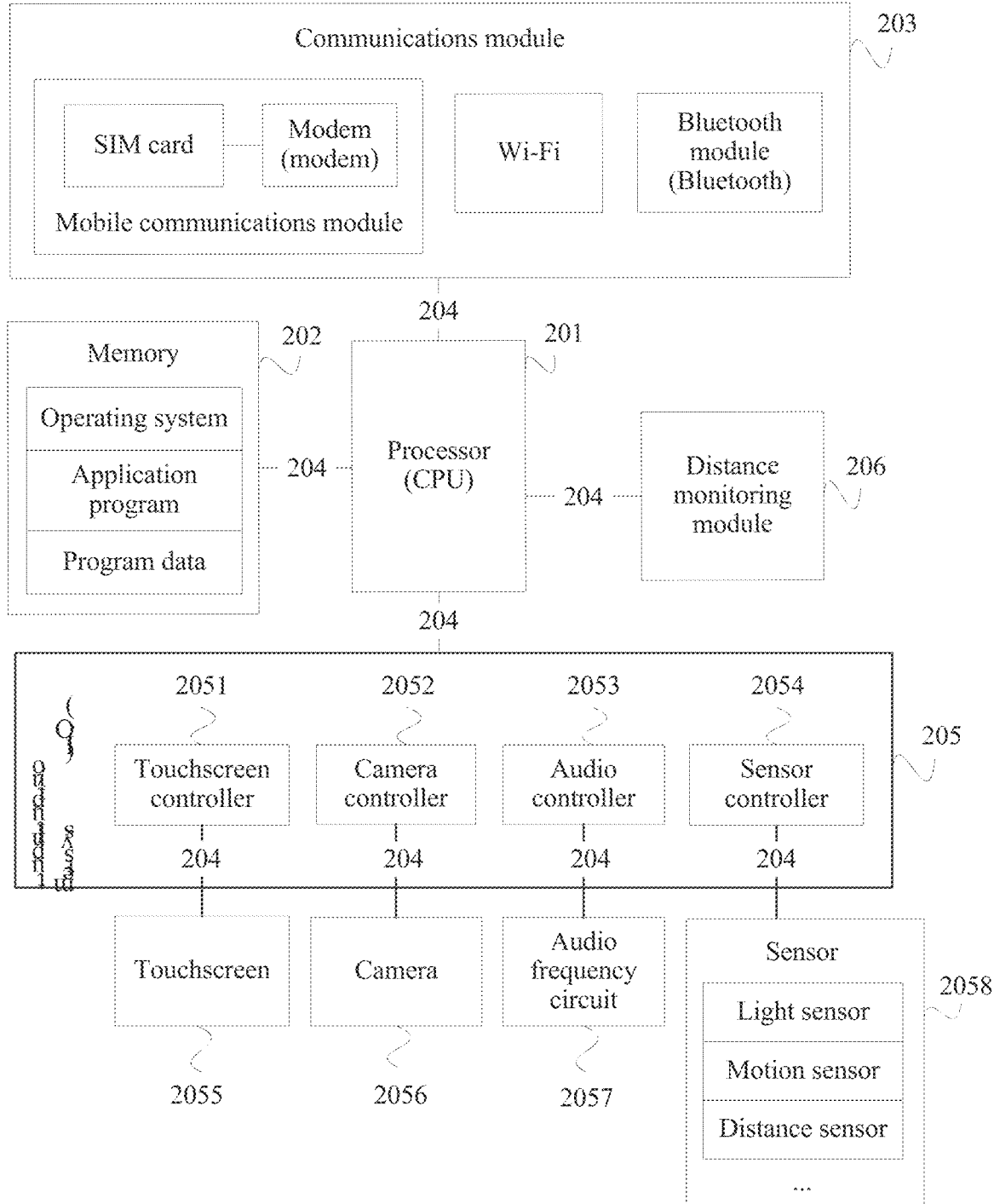
FIG. 6 is a schematic diagram of a hardware architecture of a device that is equipped with a distance monitoring element according to an embodiment of the present invention.

The following describes the first device and the second device that are provided in an embodiment of the present invention and that may be respectively a first device 100 shown in FIG. 5 and a second device 200 shown in FIG. 6.

The first device 100 is not equipped with a distance monitoring module, for example, a GPS module or an RF positioning module, and cannot directly measure an actual movement distance of the user. The first device 100 may be equipped with a motion sensor, and can collect a movement status parameter such as a movement type (running or walking) of a user during movement, a stride frequency, or a movement environment (for example, a flat road and a slope) in which the user is located. During specific implementation, the first device 100 may be the wearable device 10 in FIG. 1, and may specifically include a smart band, a pair of smart glasses, a smart accessory, smart clothing, and the like.

The second device 200 may be equipped with a distance monitoring module, for example, a GPS module or an RF positioning module, and can directly measure an actual movement distance of a user. In some embodiments, alternatively, the second device 200 may be equipped with a motion sensor, and can collect a movement status parameter such as a movement type (running or walking) of a user during movement, a stride frequency, or a movement environment (for example, a flat road and a slope) in which the user is located. During specific implementation, the second device 200 may be the smartphone 20 in FIG. 1, or may be another portable terminal that is equipped with a distance monitoring module.

Referring to FIG. 5, the first device 100 may include a processor 101, a memory 102 (one or more computer readable storage media), a communications module 103, and an input/output system 105. These components may perform communication on one or more communications buses 104.

The input/output system 105 is mainly configured to implement an interaction function between the first device 100 and a user/an external environment, and mainly includes an input/output apparatus of the first device 100. During specific implementation, the input/output system 105 may include a touchscreen controller 1052, an audio controller 1052, and a sensor controller 1053. Each controller may be coupled to respective peripherals (a touchscreen 1054, an audio frequency circuit 1055, and a motion sensor 1056). During specific implementation, the motion sensor 1056 may include an accelerometer, a gyroscope, a magnetometer, and the like; and is configured to monitor a movement status of the user and collect movement data of the user, for example, a quantity of movement steps, and a movement stride frequency. It should be noted that the input/output system 105 may further include another I/O peripheral.

The processor 101 may include one or more CPUs, a clock module, and a power management module. The clock module is mainly configured to generate a clock signal required for data transmission and time sequence control for the processor 101. The power management module is mainly configured to provide a stable and highly precise voltage for the processor 101, the communications module 103, the input/output system 105, and the like.

The communications module 103 is configured to send and receive radio signals, and mainly integrates a receiver and a transmitter that are of the first device 100. During specific implementation, the communications module 103 may include but is not limited to a Wi-Fi module and a Bluetooth module. The Wi-Fi module and the Bluetooth module may be separately used by another communications device, for example, the second device 200, to establish a communication connection such as a Wi-Fi connection and a Bluetooth connection, so as to implement short-distance data communication (as shown in FIG. 1). In some embodiments, the communications module 103 may be implemented on a separate chip.

The memory 102 is coupled to the processor 101, so as to store various software programs and/or a plurality of sets of instructions. During specific implementation, the memory 102 may include a high-speed random access memory, and may further include a non-volatile memory, such as one or more disk storage devices, a flash storage device, or another non-volatile solid-state storage device. The memory 102 may store an operating system (hereinafter referred to as a system), for example, an embedded operating system such as Android, iOS. Windows, or Linux. The memory 102 may further store a network communications program. The network communications program may be used to communicate with one or more terminal devices, such as the second device. The memory 102 may further store a user interface program. The user interface program may vividly display content of an application program by using a graphical operation interface, for example, the interface 30 in FIG. 1, and receive, by using an input control such as a menu, a dialog box, or a key, a control operation performed by the user on the application program.

Referring to FIG. 6, the second device 200 may include a processor 201, a memory 202 (one or more computer readable storage media), a communications module 203, an input/output system 205, and a distance monitoring module 206. These components may perform communication on one or more communications buses 204.

The distance monitoring module 206 may be mainly configured to perform ranging on a user of the second device 200. During specific implementation, the distance monitoring module 206 may be a GPS module, can directly measure an actual movement distance of the user by using a satellite positioning system, and may be mainly used in an outdoor open environment. In some embodiments, the distance monitoring module 206 may be an RF (Radio Frequency, Chinese: radio frequency) positioning module, for example, a Wi-Fi positioning module or a 3G positioning module; and may be mainly configured to perform positioning on the user in an indoor environment, and measure the actual movement distance of the user. In some embodiments, the distance monitoring module 206 may be an RF positioning module, for example, a Wi-Fi positioning module or a 3G positioning module; and may be configured to perform positioning and ranging on the user by using the satellite positioning system. It should be understood that a measurement result of the distance monitoring module 206 is highly precise and reliable. During specific implementation, the distance monitoring module 206 is an integrated circuit that includes an RF radio frequency chip, a baseband chip, a core processor, and a related peripheral circuit.

The input/output system 205 is mainly configured to implement an interaction function between the second device 200 and a user/an external environment, and mainly includes an input/output apparatus of the second device 200. During specific implementation, the input/output system 205 may include a touchscreen controller 2051, a camera controller 2052, an audio controller 2053, and a sensor management module 2054. Each controller may be coupled to respective peripherals (a touchscreen 2055, a camera 2056, an audio frequency circuit 2057, and a sensor 2058). It should be noted that the input/output system 205 may further include another I/O peripheral.

The processor 201 may include one or more CPUs, a clock module, and a power management module. The clock module is mainly configured to generate a clock signal required for data transmission and time sequence control for the processor 201. The power management module is mainly configured to provide a stable and highly precise voltage for the processor 201, the communications module 203, the input/output system 205, the distance monitoring module 206, and the like.

The communications module 203 is configured to send and receive radio frequency signals, and mainly integrates a receiver and a transmitter that are of the second device 200. The communications module 203 communicates with a communications network and another communications device by using the radio frequency signals. During specific implementation, the communications module 203 may include but is not limited to: a mobile communications module (for example, a 3G module), a Wi-Fi module, a Bluetooth module, and the like. During specific implementation, the Wi-Fi module and the Bluetooth module may be separately used by another communications device, for example, the first device 100, to establish a communication connection such as a Wi-Fi connection and a Bluetooth connection, so as to implement short-distance data communication (as shown in FIG. 1). In some embodiments, the communications module 203 may be implemented on a separate chip.

The memory 202 is coupled to the processor 201, so as to store various software programs and/or a plurality of sets of instructions. During specific implementation, the memory 202 may include a high-speed random access memory, and may further include a non-volatile memory, such as one or more disk storage devices, a flash storage device, or another non-volatile solid-state storage device. The memory 202 may store an operating system (hereinafter referred to as a system), for example, an embedded operating system such as Android, iOS, Windows, or Linux. The memory 202 may further store a network communications program. The network communications program may be used to communicate with one or more auxiliary devices, one or more terminal devices, and one or more network devices. The memory 202 may further store a user interface program. The user interface program may vividly display content of an application program by using a graphical operation interface, and receive, by using an input control such as a menu, a dialog box, or a key, a control operation performed by the user on the application program.

Figure 7A:
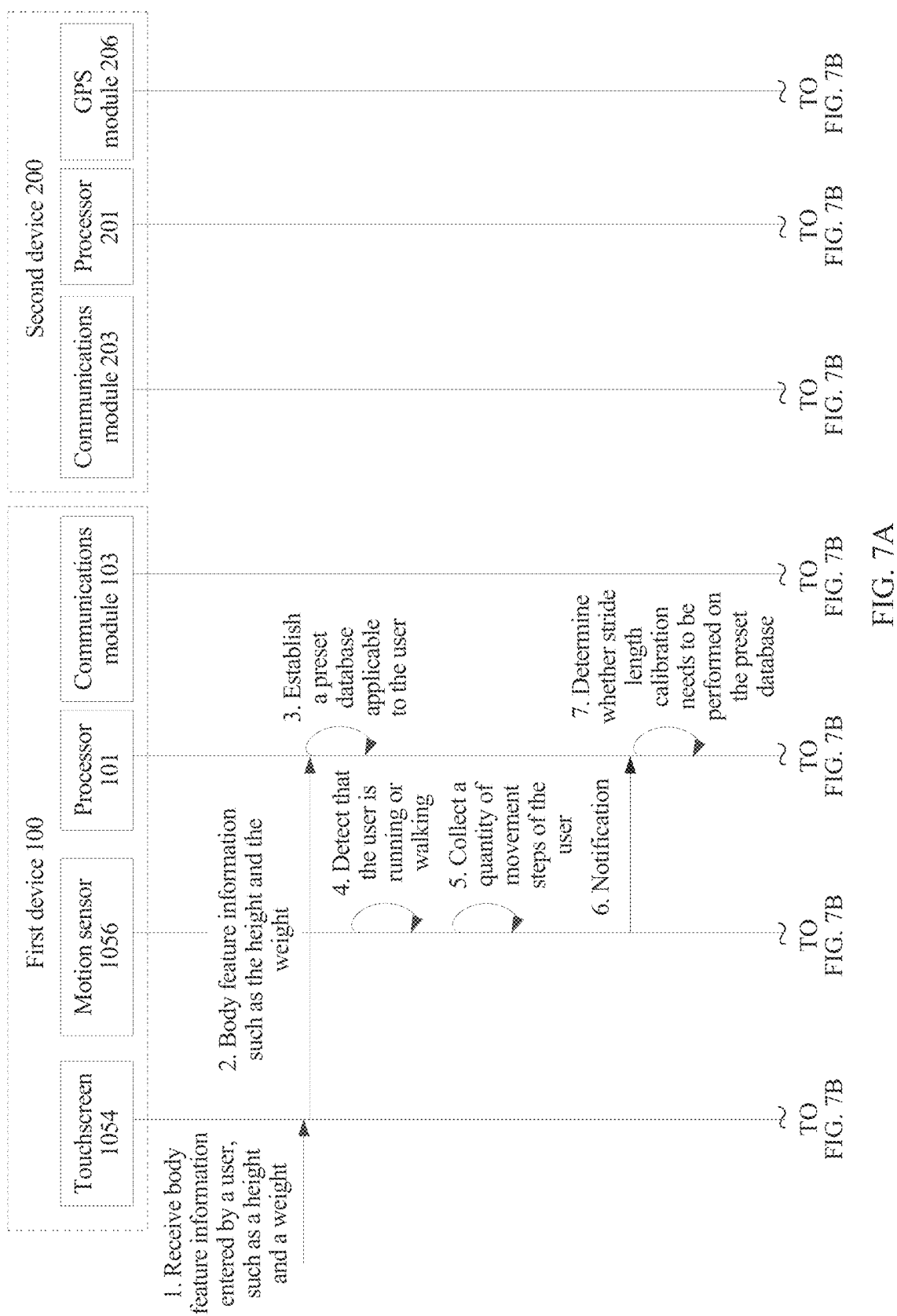
FIG. 7A to FIG. 7C are a schematic diagram of collaborative interaction between components of a device described in an embodiment in FIG. 5 and components of a device described in an embodiment in FIG. 6.
Figure 7B:
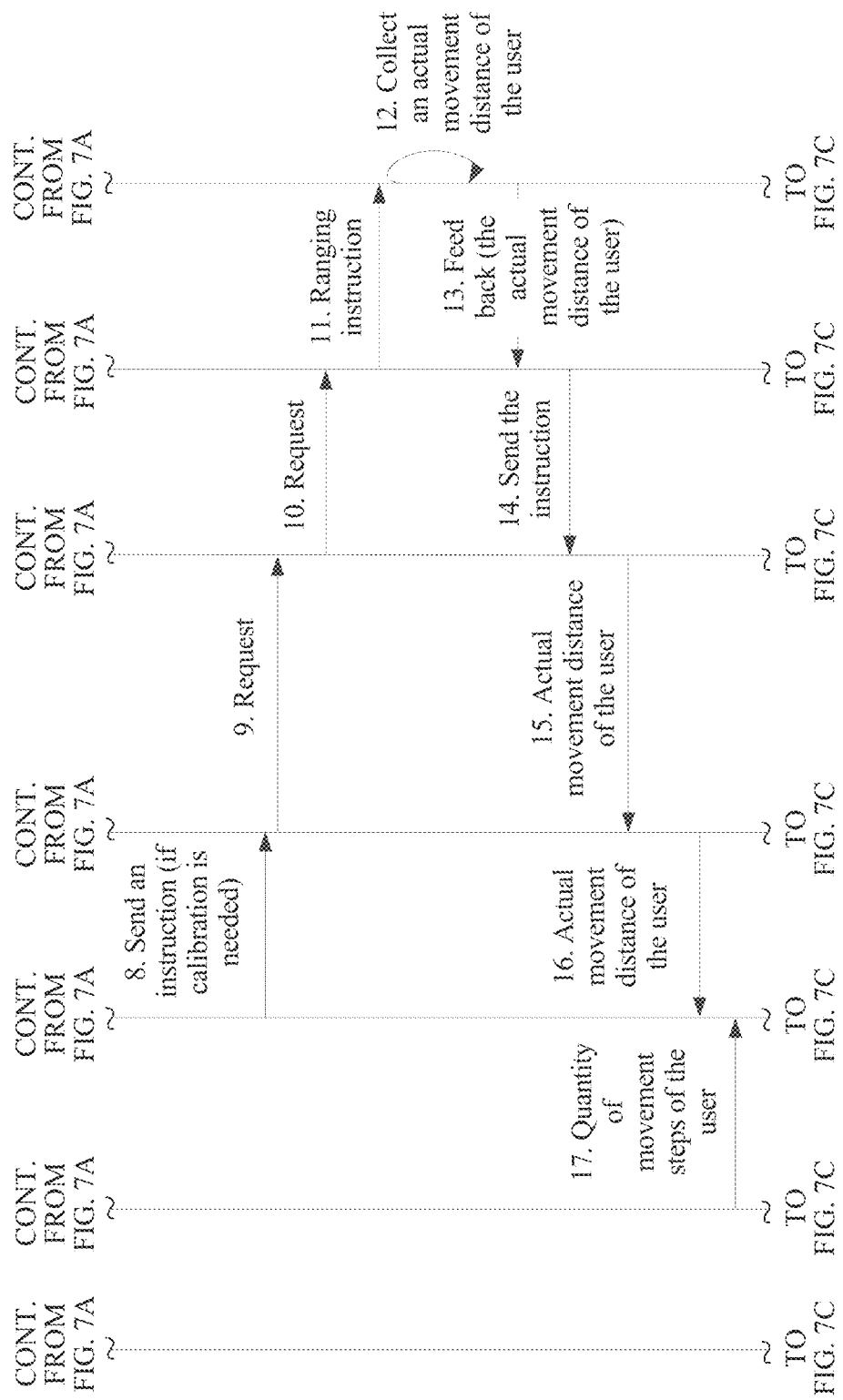
Figure 7C:
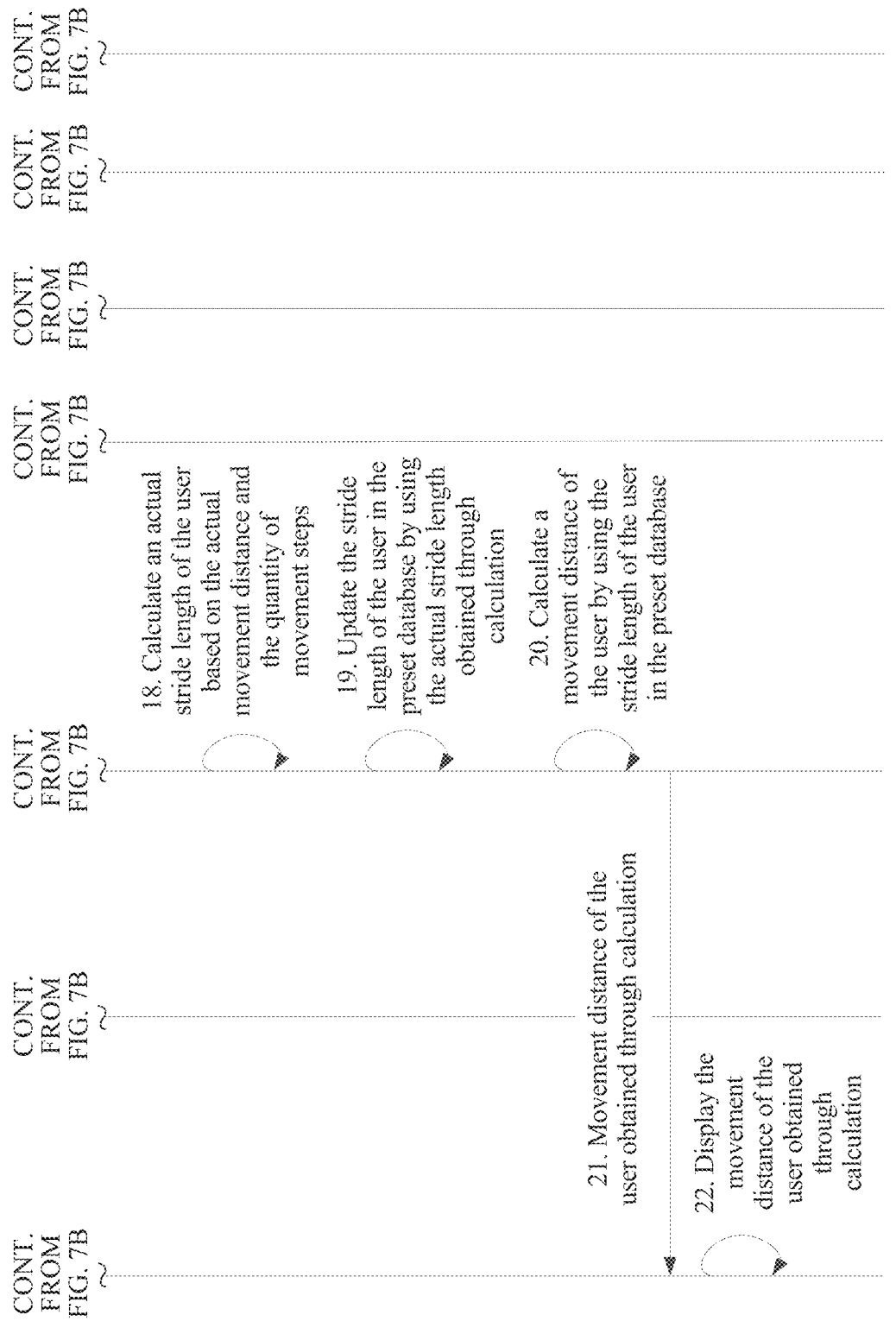

It may be understood that the first device 100 shown in FIG. 5 may be the first device in all the foregoing content, and the second device 200 shown in FIG. 6 may be the second device in all the foregoing content. The following uses the embodiment in FIG. 3 as an example to describe in detail a collaborative interaction between components in the first device 100 and components in the second device 200 in this embodiment of the present invention. Reference may be made to FIG. 7A to FIG. 7C.

1. A touchscreen 1054 receives body feature information entered by a user, such as a height and a weight. During specific implementation, the touchscreen 1054 may display the interface 30 shown in FIG. 1, so as to receive the body feature information entered by the user.

2. The touchscreen 1054 may send the body feature information of the user to a processor 101.

3. The processor 101 may establish, based on the body feature information of the user, a preset database applicable to the user. Specifically, for a process of establishing the preset database, reference may be made to the foregoing embodiment in FIG. 2, and details are not described herein again.

4-5. A motion sensor 1056 detects that the user is walking or running, and collects a quantity of movement steps of the user. During specific implementation, the motion sensor 1056 may buffer collected data that represents the actual movement distance in a memory 102, an internal storage medium of the motion sensor 1056, or another storage medium in the first device 100.

6-7. The motion sensor 1056 may notify the processor 101 of an event indicating that the user is running or walking. The processor 101 may determine whether a stride length of the user in the preset database needs to be calibrated. Specifically, if calibration is not needed, the processor 101 may directly use the stride length of the user in the preset database to calculate a movement distance, and reference may be made to 20; or if calibration is needed, the processor 101 may request to obtain, from the second device 200, the actual movement distance of the user, and reference may be made to 8. For specific implementation of the determining, refer to the embodiment in FIG. 3, and details are not described herein again.

8. If it is determined that the stride length of the user in the preset database needs to be calibrated, the processor 101 may instruct a communications module 103, for example, a Bluetooth module, to send a request to the second device 200. The request is used to request to obtain, from the second device 200, the actual movement distance of the user.

9. The communications module 103 sends the request to the second device 200 to request to obtain the actual movement distance of the user. Correspondingly, the second device 200 receives the request by using a communications module 203, for example, a Bluetooth module.

10-11. The communications module 203 transmits the request to a processor 201; and the processor 201 responds to the request, delivers a ranging instruction to a distance monitoring module 206, and triggers the distance monitoring module 206 to collect the actual movement distance of the user.

12-14. The distance monitoring module 206 responds to the ranging instruction delivered by the processor 201, collects the actual movement distance of the user, and feeds back the collected actual movement distance of the user to the processor 201. Then, the processor 201 instructs the communications module 203 to send the actual movement distance of the user to the first device 100.

During specific implementation, the distance monitoring module 206 may buffer collected data that represents the actual movement distance in a memory 202, an internal storage medium of the distance monitoring module 206, or another storage medium in the second device 200.

15. The communications module 203 sends the actual movement distance of the user to the first device 100. Correspondingly, the communications module 103 of the first device receives the actual movement distance of the user, and may notify the processor 101 of a receiving event of the actual movement distance of the user.

16-17. The processor 101 obtains the actual movement distance of the user and a quantity of movement steps of the user.

18-19. The processor 101 calculates an actual stride length of the user based on the actual movement distance of the user and the quantity of movement steps of the user, and updates the stride length of the user in the preset database by using the actual stride length obtained through calculation. Specifically, reference may be made to the embodiment in FIG. 3, and details are not described herein again.

20-22. Finally, the processor 101 may calculate the movement distance of the user by using the stride length of the user in the preset database, and send the movement distance obtained through calculation to the touchscreen 1054; and the touchscreen 1054 may display the movement distance.

It should be noted that FIG. 5 is merely an implementation of the embodiments of the present invention. In actual application, the first device 100 may further include more or fewer components, and this is not limited herein. FIG. 6 is merely an implementation of the embodiments of the present invention. In actual application, the second device 200 may further include more or fewer components, and this is not limited herein.

Figure 8:
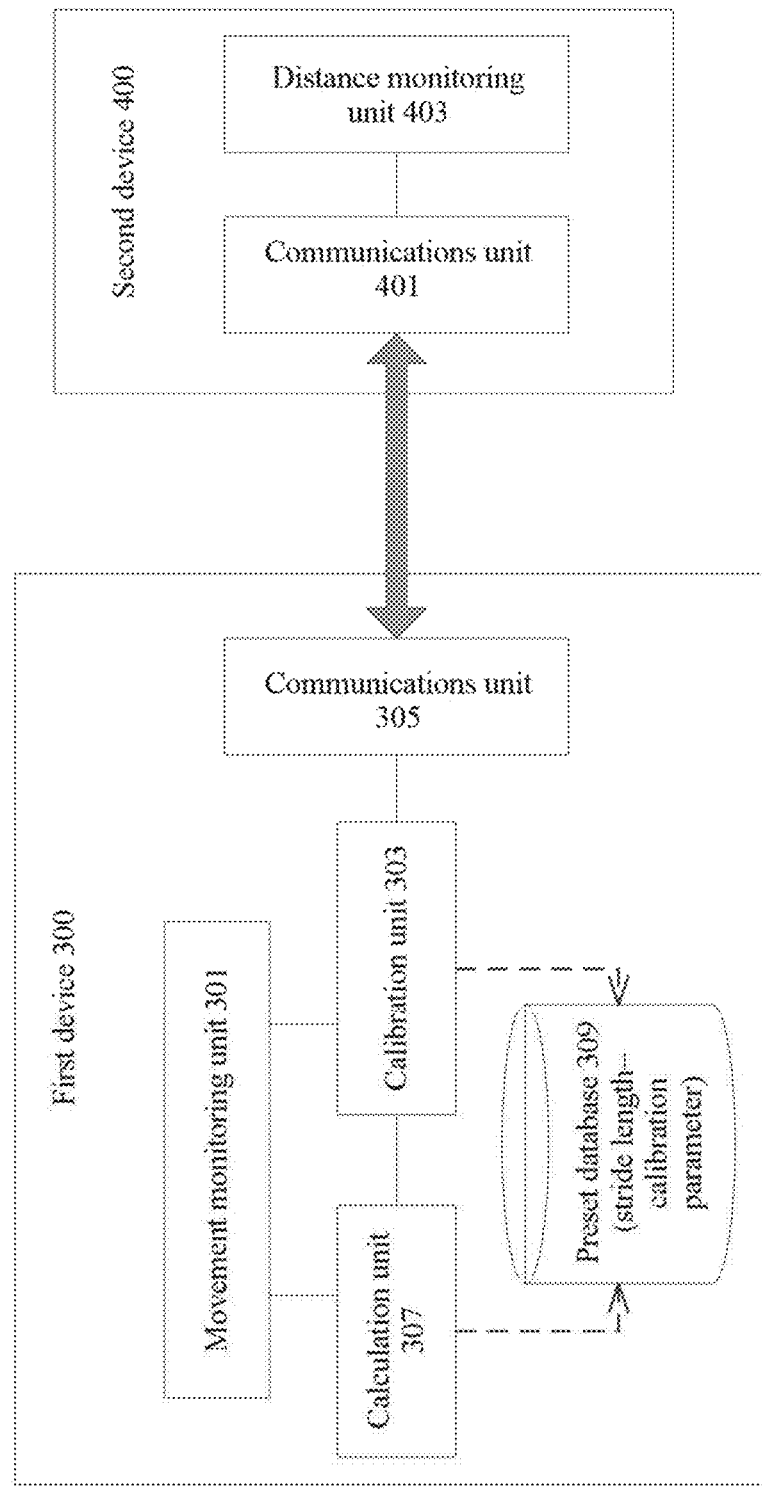
FIG. 8 is a schematic diagram of a stride length calibration system and function modules of a related device according to an embodiment of the present invention.

FIG. 8 shows an embodiment of a first device and a second device according to an embodiment of the present invention, and a schematic structural diagram of a communications system that includes the first device and the second device. As shown in FIG. 8, a communication connection, for example, a Bluetooth connection, may exist between the first device 300 and the second device 400, so as to implement data communication between the two devices. Description is provided below.

As shown in FIG. 8, the first device 300 may include a movement monitoring unit 301, a calibration unit 303, a communications unit 305, and a calculation unit 307. A first device 300 side may be configured with a preset database 309. A stride length in the preset database 309 may be provided to the first device 300 to calculate a movement distance of the user.

The movement monitoring unit 301 may be configured to detect that a user is walking or running, and collect a quantity of movement steps of the user.

The calibration unit 303 may be configured to determine whether the stride length of the user in the preset database needs to be calibrated.

The communications unit 305 may be configured to: if the calibration unit 303 determines that the stride length of the user in the preset database needs to be calibrated, request to obtain, from the second device 400, an actual movement distance of the user.

The calculation unit 307 may be configured to calculate an actual stride length of the user based on the actual movement distance of the user and the quantity of movement steps of the user.

The calibration unit 303 may be further configured to update the stride length of the user in the preset database by using the actual stride length obtained through calculation.

In this embodiment of the present invention, the preset database may further include a movement status parameter of the user, where the movement status parameter of the user is corresponding to the stride length of the user. The movement status parameter of the user includes at least one of the following: a movement stride frequency, a movement type, or a movement environment in which the user is located. For details, reference may be made to the foregoing embodiments.

Specifically, the movement monitoring unit 301 may be further configured to collect the movement status parameter of the user when it is detected that the user is walking or running. The calculation unit 307 may be further configured to obtain, through calculation based on an actual movement distance and a quantity of movement steps of the user in a movement status represented by a same movement status parameter, an actual stride length of the user in the movement status represented by the same movement status parameter. The calibration unit 303 may be further configured to update, by using the actual stride length obtained through calculation, a stride length that is in the preset database and that is of the user in the movement status represented by the same movement status parameter.

As shown in FIG. 8, the second device 400 may include a communications unit 401 and a distance monitoring unit 403.

The communications unit 401 may be configured to receive a request sent by the first device 300.

The distance monitoring unit 403 may be configured to respond to the request, and collect an actual movement distance of the user.

The communications unit 401 may be further configured to send the actual movement distance of the user to the first device 300.

Specifically, the request is sent by the first device 300 by using the communications unit 305 after detecting that the user is walking or running, and determining that the stride length of the user in the preset database needs to be calibrated.

During specific implementation, the first device 300 may be a mobile device that is equipped with a motion sensor and is not equipped with a distance monitoring unit (for example, the GPS), for example, a smart band, a smartwatch, or a smart accessory. The second device 400 may be a mobile device that is equipped with a distance detection unit, for example, a smartphone or a smart band.

It should be noted that, for content that is not mentioned and specific implementations of function units in the embodiment in FIG. 8, reference may be made to the embodiment in FIG. 3, and details are not described herein again.

Figure 9:
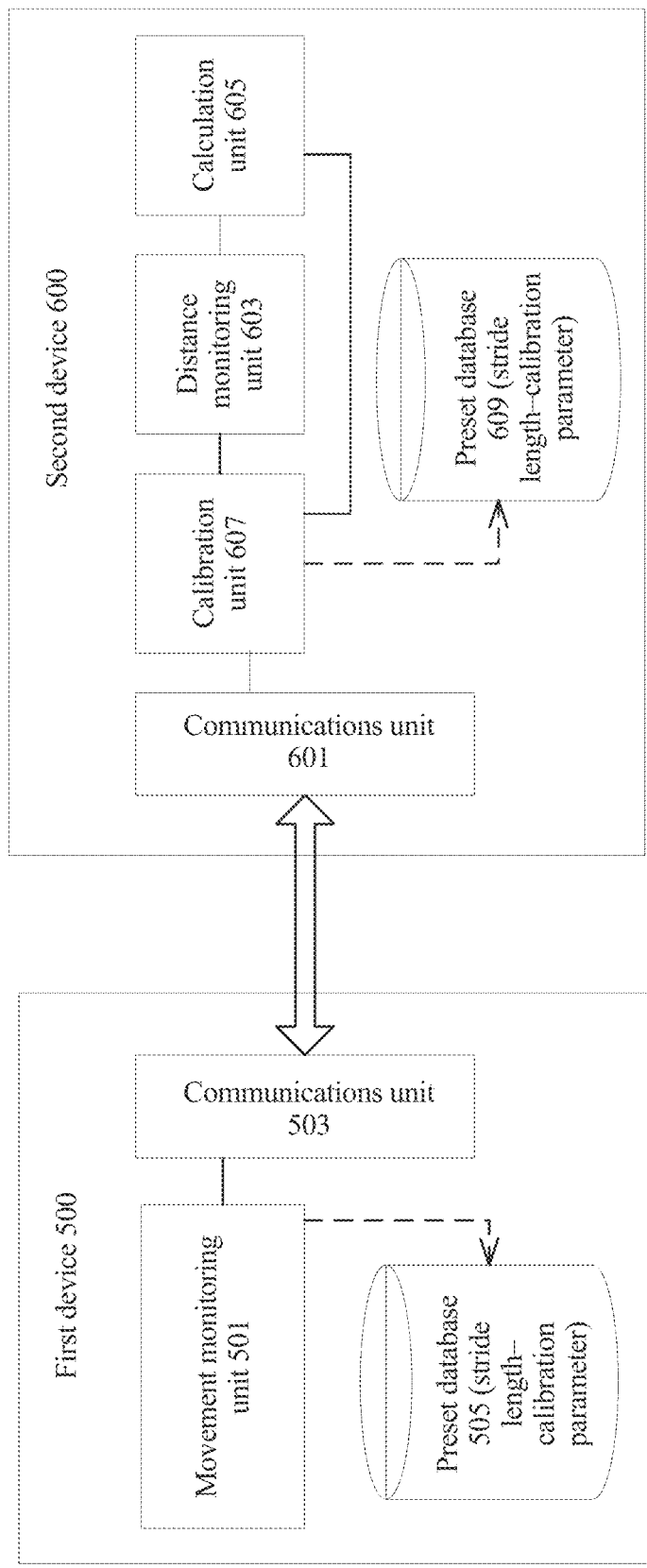
FIG. 9 is a schematic diagram of another stride length calibration system and function modules of a related device according to an embodiment of the present invention.

FIG. 9 shows another embodiment of a first device and a second device according to an embodiment of the present invention, and a schematic structural diagram of a communications system that includes the first device and the second device. As shown in FIG. 9, a communication connection, for example, a Bluetooth connection, may exist between the first device 500 and the second device 600, so as to implement data communication between the two devices. Description is provided below. During specific implementation, a first device 500 side may be configured with a preset database 505. A stride length in the preset database 505 may be provided to the first device 500 to calculate a movement distance of the user. A second device side maintains a preset database 609. The second device may calibrate a stride length in the preset database 609, and send the calibrated preset database 609 to the first device 500, so as to update the preset database 505.

As shown in FIG. 9, the first device 500 may include a movement monitoring unit 501 and a communications unit 505.

The movement monitoring unit 501 may be configured to detect that a user is walking or running, and collect a quantity of movement steps of the user.

The communications unit 505 may be configured to: receive a request sent by the second device, respond to the request, and send the quantity of movement steps of the user to the second device.

Specifically, the request is sent by the second device 600 after the first device 500 detects that the user is walking or running and determines that the stride length of the user in the preset database 609 needs to be calibrated.

As shown in FIG. 9, the second device 600 may include a communications unit 601, a calibration unit 603, a distance monitoring unit 605, and a calculation unit 607.

The communications unit 601 may be configured to detect, by using the first device 500, that the user is walking or running.

The calibration unit 603 may be configured to determine whether the stride length of the user in the preset database needs to be calibrated.

The distance monitoring unit 605 may be configured to: if the calibration unit 605 determines that the stride length of the user in the preset database needs to be calibrated, collect an actual movement distance of the user, and obtain the quantity of movement steps of the user.

The calculation unit 607 may be further configured to calculate an actual movement stride length of the user based on the quantity of movement steps of the user and the actual movement distance of the user.

The calibration unit 603 may be further configured to update the stride length of the user in the preset database by using the actual movement stride length of the user.

The communications unit 601 may be further configured to send the preset database to the first device 500.

In the embodiment in FIG. 9, the preset database may further include a movement status parameter of the user, where the movement status parameter of the user is corresponding to the stride length of the user. The movement status parameter of the user may include at least one of the following: a movement stride frequency, a movement type, or a movement environment in which the user is located. For details, reference may be made to the foregoing embodiments.

Specifically, the communications unit 601 in the second device 600 may be further configured to request to obtain the movement status parameter of the user from the first device 500. Correspondingly, the movement monitoring unit 501 in the first device 500 may be configured to collect the movement status parameter of the user. The calculation unit 607 in the second device 600 may be configured to obtain, through calculation based on an actual movement distance and a quantity of movement steps of the user in a movement status represented by a same movement status parameter, an actual stride length of the user in the movement status represented by the same movement status parameter. The calibration unit 603 in the second device 600 may be configured to update, by using the actual stride length obtained through calculation, a stride length that is in the preset database and that is of the user in the movement status represented by the same movement status parameter.

During specific implementation, the first device 500 may be a mobile device that is equipped with a motion sensor and is not equipped with a distance monitoring unit (for example, the GPS), for example, a smart band, a smartwatch, or a smart accessory. The second device 600 may be a mobile device that is equipped with a distance detection unit, for example, a smartphone or a smart band.

It should be noted that, for content that is not mentioned and specific implementations of function units in the embodiment in FIG. 9, reference may be made to the embodiment in FIG. 4, and details are not described herein again.

In addition, an embodiment of the present invention further provides a communications system, and the communications system includes a first device and a second device.

In an embodiment, the communications system may be the communications system shown in FIG. 8; and the first device may be the first device 300, and the second device may be the second device 400. In some embodiments, the first device may be the first device 100 described in the embodiment in FIG. 5, and the second device may be the second device 200 described in the embodiment in FIG. 6. It should be understood that the first device may alternatively be the first device described in the embodiment in FIG. 3, and the second device may alternatively be the second device described in the embodiment in FIG. 3.

In another embodiment, the communications system may be the communications system shown in FIG. 9; and the first device may be the first device 500, and the second device may be the second device 600. In some embodiments, the first device may be the first device 100 described in the embodiment in FIG. 5, and the second device may be the second device 200 described in the embodiment in FIG. 6. It should be understood that the first device may alternatively be the first device described in the embodiment in FIG. 4, and the second device may alternatively be the second device described in the embodiment in FIG. 4.

In conclusion, in this embodiment of the present invention, for a preset database (including a stride length of the user) that is used to calculate a movement distance of the user and that is on a device (that is, the first device) side that is not equipped with a distance monitoring element, an actual movement distance of the user may be obtained by using a device (that is, the second device) that is equipped with a distance monitoring element, to calibrate the stride length in the preset database, so that accuracy of calculating the movement distance by the first device may be improved. In addition, after calibration is complete, the first device can independently and accurately calculate the movement distance of the user.

A person skilled in the art should understand that the embodiments of the present invention may be provided as a method, a system, or a computer program product. Therefore, the present invention may use a form of hardware only embodiments, software only embodiments, or embodiments with a combination of software and hardware. In addition, the present invention may use a form of a computer program product that is implemented on one or more computer-usable storage media (including but not limited to a disk memory, an optical memory, and the like) that include computer-usable program code.

The present invention is described with reference to flowcharts and/or block diagrams of methods, devices (systems), and computer program products provided in the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A stride length calibration method performed by a first device, wherein the stride length calibration method comprises:
    detecting that a user is walking or running;
    collecting a quantity of movement steps of the user;
    detecting a movement environment in which the user is located, wherein the movement environment comprises a flat surface or a sloped surface;
    determining whether a stride length of the user in a preset database needs calibration, wherein the preset database comprises the movement environment corresponding to the stride length of the user;
    requesting, when calibration is needed, to obtain, from a second device, an actual movement distance of the user through a communication connection between the first device and the second device, wherein the second device comprises a Global Positioning System (GPS);
    calculating an actual stride length of the user based on the actual movement distance of the user, the quantity of the movement steps of the user, and the movement environment in which the user is located; and
    updating the stride length of the user in the preset database using the actual stride length.

2. The stride length calibration method of claim 1, wherein the preset database further comprises a movement status parameter of the user corresponding to the stride length, and wherein the stride length calibration method further comprises:
    collecting the movement status parameter of the user when the user is walking or running;
    obtaining, through calculation based on an actual movement distance and a quantity of movement steps of the user in a movement status represented by a same movement status parameter, an actual stride length of the user in the movement status represented by the same movement status parameter; and
    updating, using the actual stride length, a stride length that is in the preset database and that is of the user in the movement status represented by the same movement status parameter.

3. The stride length calibration method of claim 2, wherein the movement status parameter of the user comprises a movement stride frequency or a movement type.

4. The stride length calibration method of claim 1, wherein the preset database further comprises body feature information of the user, and wherein the body feature information of the user corresponds to the stride length of the user.

5. The stride length calibration method of claim 1, wherein the preset database further comprises a latest calibration time corresponding to the stride length of the user, and wherein the determining whether the stride length of the user in the preset database needs calibration comprises:
    determining whether a difference between the latest calibration time and a current time is greater than a preset time threshold; and
    determining, when the difference is greater than the preset time threshold, determining that the stride length of the user needs calibration, or
    determining, when the difference is not greater than the preset time threshold, determining that the stride length of the user does not need to be calibrated.

6. The stride length calibration method of claim 1, wherein after requesting to obtain, from the second device, the actual movement distance of the user, the stride length calibration method further comprises filtering out invalid data from data that represents the actual movement distance.

7. The stride length calibration method of claim 1, further comprising:
    obtaining, subsequent to updating the stride length of the user in the preset database, the stride length of the user from the preset database; and
    calculating a movement distance of the user using the stride length of the user obtained from the preset database.

8. The stride length calibration method of claim 1, wherein the preset database further comprises a latest calibration time corresponding to the stride length of the user, and wherein the determining whether the stride length of the user in the preset database needs calibration comprises:
    determining whether a difference between the latest calibration time and a current time is greater than a preset time threshold; and
    determining, when the difference is greater than the preset time threshold, that the stride length of the user needs calibration.

9. The stride length calibration method of claim 1, wherein the preset database further comprises a latest calibration time corresponding to the stride length of the user, and wherein the determining whether the stride length of the user in the preset database needs calibration comprises:
    determining whether a difference between the latest calibration time and a current time is greater than a preset time threshold; and
    determining, when the difference is not greater than the preset time threshold, that the stride length of the user does not need to be calibrated.

10. A stride length calibration method performed by a second device, wherein the stride length calibration method comprises:
    detecting that a user is walking or running;
    determining whether a stride length of the user in a preset database needs calibration;

collecting an actual movement distance of the user when calibration is needed;

obtaining a quantity of movement steps of the user when calibration is needed;

detecting a movement environment in which the user is located when calibration is needed, wherein the movement environment comprises a flat surface or a sloped surface;

calculating an actual movement stride length of the user based on the quantity of the movement steps of the user, the actual movement distance of the user, and the movement environment in which the user is located;

updating the stride length of the user in the preset database using the actual movement stride length of the user; and sending the preset database to a first device through a communication connection between the first device and the second device.

11. The stride length calibration method of claim 10, wherein the preset database further comprises a movement status parameter of the user corresponding to the stride length, and wherein the stride length calibration method further comprises:

requesting to obtain the movement status parameter of the user from the first device when calibration is needed, wherein the first device is configured to collect the movement status parameter of the user;

obtaining, through calculation based on an actual movement distance and a quantity of movement steps of the user in a movement status represented by a same movement status parameter, an actual stride length of the user in the movement status represented by the same movement status parameter; and updating, using the actual movement stride length, a stride length that is in the preset database and that is of the user in the movement status represented by the same movement status parameter.

12. The stride length calibration method of claim 11, wherein the movement status parameter of the user comprises a movement stride frequency or a movement type.

13. The stride length calibration method of claim 10, wherein the preset database further comprises body feature information of the user, and wherein the body feature information of the user corresponds to the stride length of the user.

14. The stride length calibration method of claim 10, wherein the preset database further comprises a latest calibration time corresponding to the stride length of the user, and wherein the determining, by the second device, whether the stride length of the user in the preset database needs calibration comprises:

determining, by the second device, whether a difference between the latest calibration time and a current time is greater than a preset time threshold; and determining, when the difference is greater than the preset time threshold, that the stride length of the user needs calibration, or determining, when the difference is not greater than the preset time threshold, that the stride length of the user does not need to be calibrated.

15. The stride length calibration method of claim 10, wherein after requesting, by the second device, to obtain the quantity of the movement steps of the user from the first device, the stride length calibration method further comprises filtering out invalid data from data that represents the quantity of movement steps of the user.

16. The stride length calibration method of claim 10, wherein the preset database further comprises a latest calibration time corresponding to the stride length of the user, and wherein the determining, by the second device, whether the stride length of the user in the preset database needs calibration comprises:

determining, by the second device, whether a difference between the latest calibration time and a current time is greater than a preset time threshold; and determining, when the difference is greater than the preset time threshold, that the stride length of the user needs calibration.

17. The stride length calibration method of claim 10, wherein the preset database further comprises a latest calibration time corresponding to the stride length of the user, and wherein the determining, by the second device, whether the stride length of the user in the preset database needs calibration comprises:

determining, by the second device, whether a difference between the latest calibration time and a current time is greater than a preset time threshold; and determining, when the difference is not greater than the preset time threshold, that the stride length of the user does not need to be calibrated.

18. A mobile device, wherein the mobile device is a first device and comprises:

a motion sensor configured to:
  detect that a user is walking or running;
  collect a quantity of movement steps of the user; and
  detect a movement environment in which the user is located, wherein the movement environment comprises a flat surface or a sloped surface;

a processor coupled to the motion sensor and configured to determine whether a stride length of the user in a preset database needs calibration, wherein the preset database comprises the movement environment corresponding to the stride length of the user; and a transceiver coupled to the processor and configured to request to obtain, from a second device, an actual movement distance of the user when the stride length of the user in the preset database needs calibration through a communication connection between the first device and the second device, wherein the processor is further configured to:
  calculate an actual stride length of the user based on the actual movement distance of the user, the quantity of movement steps of the user, and the movement environment in which the user is located; and
  update the stride length of the user in the preset database using the actual stride length.

19. The mobile device of claim 18, wherein the preset database further comprises a movement status parameter of the user corresponding to the stride length, wherein the motion sensor is further configured to collect the movement status parameter of the user when it is detected that the user is walking or running, and wherein the processor is further configured to:

obtain, through calculation based on an actual movement distance and a quantity of movement steps of the user in a movement status represented by a same movement status parameter, an actual stride length of the user in the movement status represented by the same movement status parameter; and update, using the actual stride length, a stride length that is in the preset database and that is of the user in the movement status represented by the same movement status parameter.

20. The mobile device of claim 18, wherein the processor is further configured to:

obtain, subsequent to updating the stride length of the user in the preset database, the stride length of the user from the preset database; and calculate a movement distance of the user using the stride length of the user obtained from the preset database.

* * * * *